US009251343B1

(12) United States Patent
Vincent et al.

(10) Patent No.: US 9,251,343 B1
(45) Date of Patent: Feb. 2, 2016

(54) DETECTING BOOTKITS RESIDENT ON COMPROMISED COMPUTERS

(71) Applicant: FireEye, Inc., Milpitas, CA (US)

(72) Inventors: Michael M. Vincent, Sunnyvale, CA (US); Abhishek Singh, Milpitas, CA (US); Muhammad Amin, Fremont, CA (US); Zheng Bu, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 183 days.

(21) Appl. No.: 13/841,633

(22) Filed: Mar. 15, 2013

(51) Int. Cl.
G06F 12/14 (2006.01)
G06F 21/56 (2013.01)

(52) U.S. Cl.
CPC .............. G06F 21/56 (2013.01); G06F 21/566 (2013.01)

(58) Field of Classification Search
CPC ................................ G06F 21/56; G06F 21/566
See application file for complete search history.

(56) References Cited

U.S. PATENT DOCUMENTS

| 4,292,580 A | 9/1981 | Ott et al. |
| 5,175,732 A | 12/1992 | Hendel et al. |
| 5,440,723 A | 8/1995 | Arnold et al. |
| 5,537,540 A * | 7/1996 | Miller et al. ............... 714/38.13 |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,269,330 B1 | 7/2001 | Cidon et al. |
| 6,279,113 B1 | 8/2001 | Vaidya |
| 6,298,445 B1 | 10/2001 | Shostack |
| 6,357,008 B1 | 3/2002 | Nachenberg |
| 6,424,627 B1 | 7/2002 | Sorhaug et al. |
| 6,484,315 B1 | 11/2002 | Ziese |
| 6,487,666 B1 | 11/2002 | Shanklin et al. |

(Continued)

FOREIGN PATENT DOCUMENTS

| GB | 2439806 | 1/2008 |
| WO | WO-02/06928 | 1/2002 |

(Continued)

OTHER PUBLICATIONS

*IEEE Xplore Digital Library Sear Results for "detection of unknown computer worms".* Http//ieeexplore.ieee.org/searchresult.jsp?SortField=Score&SortOrder=desc&ResultC . . . , (Accessed on Aug. 28, 2009).

(Continued)

*Primary Examiner* — Matthew Henning
(74) *Attorney, Agent, or Firm* — Rutan & Tucker LLP; William W. Schaal

(57) ABSTRACT

Techniques detect bootkits resident on a computer by detecting a change or attempted change to contents of boot locations (e.g., the master boot record) of persistent storage, which may evidence a resident bootkit. Some embodiments may monitor computer operations seeking to change the content of boot locations of persistent storage, where the monitored operations may include API calls performing, for example, WRITE, READ or APPEND operations with respect to the contents of the boot locations. Other embodiments may generate a baseline hash of the contents of the boot locations at a first point of time and a hash snapshot of the boot locations at a second point of time, and compare the baseline hash and hash snapshot where any difference between the two hash values constitutes evidence of a resident bootkit.

28 Claims, 9 Drawing Sheets

(56) References Cited

U.S. PATENT DOCUMENTS

| | | |
|---|---|---|
| 6,493,756 B1 | 12/2002 | O'Brien et al. |
| 6,550,012 B1 | 4/2003 | Villa et al. |
| 6,775,657 B1 | 8/2004 | Baker |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,408 B1 | 7/2006 | Pak et al. |
| 7,093,002 B2 | 8/2006 | Wolff et al. |
| 7,093,239 B1 | 8/2006 | van der Made |
| 7,100,201 B2 | 8/2006 | Izatt |
| 7,159,149 B2 | 1/2007 | Spiegel et al. |
| 7,231,667 B2 | 6/2007 | Jordan |
| 7,240,364 B1 | 7/2007 | Branscomb et al. |
| 7,240,368 B1 | 7/2007 | Roesch et al. |
| 7,287,278 B2 | 10/2007 | Liang |
| 7,308,716 B2 | 12/2007 | Danford et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,849,506 B1 | 12/2010 | Dansey et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,996,556 B2 | 8/2011 | Raghavan et al. |
| 7,996,836 B1 | 8/2011 | McCorkendale et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,201,246 B1 | 6/2012 | Wu et al. |
| 8,204,984 B2 | 6/2012 | Aziz et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,709 B2 | 7/2012 | Viljoen et al. |
| 8,239,944 B1 | 8/2012 | Nachenberg et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,365,286 B2 | 1/2013 | Poston |
| 8,365,297 B1* | 1/2013 | Parshin et al. ............. 726/26 |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,510,827 B1 | 8/2013 | Leake et al. |
| 8,510,842 B2 | 8/2013 | Amit et al. |
| 8,516,593 B2 | 8/2013 | Aziz |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,713,681 B2 | 4/2014 | Silberman et al. |
| 9,087,199 B2* | 7/2015 | Sallam ..................... 1/1 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0144156 A1 | 10/2002 | Copeland, III |
| 2002/0162015 A1 | 10/2002 | Tang |
| 2002/0166063 A1 | 11/2002 | Lachman et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0115483 A1 | 6/2003 | Liang |
| 2003/0188190 A1 | 10/2003 | Aaron et al. |
| 2003/0200460 A1 | 10/2003 | Morota et al. |
| 2003/0212902 A1 | 11/2003 | Van Der Made |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0093513 A1 | 5/2004 | Cantrell et al. |
| 2004/0111531 A1 | 6/2004 | Staniford et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0114663 A1 | 5/2005 | Cornell et al. |
| 2005/0125195 A1 | 6/2005 | Brendel |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |

(56) References Cited

U.S. PATENT DOCUMENTS

| | | |
|---|---|---|
| 2005/0238005 A1 | 10/2005 | Chen et al. |
| 2005/0265331 A1 | 12/2005 | Stolfo |
| 2005/0283839 A1* | 12/2005 | Cowburn ............... 726/26 |
| 2006/0010495 A1 | 1/2006 | Cohen et al. |
| 2006/0015715 A1 | 1/2006 | Anderson |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0094730 A1 | 4/2007 | Bhikkaji et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0192863 A1 | 8/2007 | Kapoor et al. |
| 2007/0198275 A1 | 8/2007 | Malden et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0271446 A1 | 11/2007 | Nakamura |
| 2008/0005782 A1 | 1/2008 | Aziz |
| 2008/0046781 A1* | 2/2008 | Childs et al. ............... 714/15 |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1* | 4/2008 | Lekel ............... 717/124 |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0320594 A1 | 12/2008 | Jiang |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0044024 A1 | 2/2009 | Oberheide et al. |
| 2009/0044274 A1 | 2/2009 | Budko et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0158430 A1 | 6/2009 | Borders |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1* | 12/2009 | Zhang et al. ............... 714/19 |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0017546 A1 | 1/2010 | Poo et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0113231 A1 | 5/2011 | Kaminsky |
| 2011/0145920 A1 | 6/2011 | Mahaffey et al. |
| 2011/0167494 A1 | 7/2011 | Bowen et al. |
| 2011/0219450 A1 | 9/2011 | McDougal et al. |
| 2011/0247072 A1 | 10/2011 | Staniford et al. |
| 2011/0265182 A1 | 10/2011 | Peinado et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0079596 A1 | 3/2012 | Thomas et al. |
| 2012/0084859 A1 | 4/2012 | Radinsky et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255017 A1* | 10/2012 | Sallam ............... 726/24 |
| 2012/0278886 A1 | 11/2012 | Luna |
| 2012/0297489 A1 | 11/2012 | Dequevy |
| 2012/0330801 A1 | 12/2012 | McDougal et al. |
| 2013/0036472 A1 | 2/2013 | Aziz |
| 2013/0047257 A1 | 2/2013 | Aziz |
| 2013/0097706 A1 | 4/2013 | Titonis et al. |
| 2013/0111587 A1 | 5/2013 | Goel et al. |
| 2013/0160130 A1 | 6/2013 | Mendelev et al. |
| 2013/0160131 A1 | 6/2013 | Madou et al. |
| 2013/0227691 A1 | 8/2013 | Aziz et al. |
| 2013/0246370 A1 | 9/2013 | Bartram et al. |

(56) References Cited

U.S. PATENT DOCUMENTS

| | | |
|---|---|---|
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2014/0053260 A1 | 2/2014 | Gupta et al. |
| 2014/0053261 A1 | 2/2014 | Gupta et al. |
| 2014/0351935 A1* | 11/2014 | Shao et al. ................. 726/23 |

FOREIGN PATENT DOCUMENTS

| | | |
|---|---|---|
| WO | WO-02/23805 | 3/2002 |
| WO | WO-2007-117636 | 10/2007 |
| WO | WO-2008/041950 | 4/2008 |
| WO | WO-2011/084431 | 7/2011 |
| WO | WO-2012145066 | 10/2012 |

OTHER PUBLICATIONS

Bayer, et al., "Dynamic Analysis of Malicious Code", *J Comput Virol*, Springer-Velag, France., (2006), pp. 67-77.

Chaudet, C., et al., "Optimal Positioning of Active and Passive Monitoring Devices", *International Conference on Emerging Networking Experiments and Technologies, Proceedings of the 2005 ACM Conference on Emerging Network Experiment and Technology*, CoNEXT '05, Toulousse, France, (Oct. 2005), pp. 71-82.

Kristoff, J., "Botnets, Detection and Mitigation: DNS-Based Techniques", *NU Security Day*, (2005), 23 pages.

Moore, D., et al., "Internet Quarantine: Requirements for Containing Self-Propagating Code", *INFOCOM*, vol. 3, (Mar. 30-Apr. 3, 2003), pp. 1901-1910.

Morales, Jose A., et al., ""Analyzing and exploiting network behaviors of malware."", *Security and Privacy in Communication Networks. Springer Berlin Heidelberg*, 2010. 20-34.

Williamson, Matthew M., "Throttling Viruses: Restricting Propagation to Defeat Malicious Mobile Code", *ACSAC Conference, Las Vegas, NV, USA*, (Dec. 2002), pp. 1-9.

IEEE Xplore Digital Library Sear Results for "detection of unknown computer worms", Http://ieeexolore.ieee.org/searchresult. jsp?SortField=Score&SortOrder=desc&ResultC . . . , (Accessed on Aug. 28, 2009).

AltaVista Advanced Search Results. "Event Orchestrator", Http://www.altavista.com/web/results?Itag=ody&pg=aq&aqmode=aqa. Event+Orchesrator . . . , (Accessed on Sep. 3, 2009).

AltaVista Advanced Search Results. "attack vector identifier", Http://www.altavista.com/web/results?Itag=odv&pg=aq &aqmode=aqa=Event+Orchestrater . . . , (Accessed on Sep. 15, 2009).

Cisco, *Configuring the Catalyst Switched Port Analyzer* (SPAN) ("Cisco"), (1999-2003).

Reiner Sailer, Enriciuillo Valdez, Trent Jaeger, Roonald Perez, Leendert van Doorn, John Linwood Griffin, Stefan Berger., *sHype: Secure Hypervisor Approach to Trusted Virtualized Systems* (Feb. 2, 2005) ("Sailer").

Excerpt regarding First Printing Date for Merike Kaeo, *Designing Network Security* ("Kaeo"), (2005).

*The Sniffers's Guide to Raw Traffic* available at: yuba.stanford. edu/~casado/pcap/section1.html. (Jan. 6, 2014).

"Network Security: NetDetector—Network Intrusion Forensic System (NIFS) Whitepaper", ("*NetDetector Whitepaper*"), (2003).

"Packet", *Microsoft Computer Dictionary, Microsoft Press*, (Mar. 2002), 1 page.

"When Virtual is Better Than Real", IEEEXplore Digital Library, available at, http://ieeexplore.ieee.org/xpl/articleDetails. jsp?reload=true&arnumber=990073, (Dec. 7, 2013).

Abdullah, et al., *Visualizing Network Data for Intrusion Detection*, 2005 IEEE Workshop on Information Assurance and Security, pp. 100-108.

Adetoye, Adedayo, et al., "Network Intrusion Detection & Response System", ("*Adetoye*"), (Sep. 2003).

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", *Springer-verlag Berlin Heidelberg*, (2006), pp. 165-184.

Bayer, et al., "Dynamic Analysis of Malicious Code", *J Comput Virol*, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/g2/319("Boubalos") Jun. 5, 2003.

Chaudet, C., et al., "Optimal Positioning of Active and Passive Monitoring Devices", International Conference on Emerging Networking Experiments Technologies, Proceedings of the 2005 ACM Conference on Emerging Network Experiment and Technology, CoNEXT '05, Toulousse, France, (Oct. 2005), pp. 71-82.

Cohen, M.I., "PyFlag—An advanced network forensic framework", *Digital Investigation 5*, Elsevier, (2008), pp. S112-S120.

Costa, M., et al., "Vigilante: End-to-End Containment of Internet Worms", *SOSP '05, Association for Computing Machinery, Inc.*, Brighton U.K., (Oct. 23-26, 2005).

Crandall, J.R., et al., "Minos: Control Data Attack Prevention Orthogonal to Memory Model", *37th International Symposium on Microarchitecture*, Portland, Oregon, (Dec. 2004).

Deutsch, P., "Zlib compressed data format specification version 3.3" RFC 1950, (1996).

Distler, "Malware Analysis: An Introduction", *SANS Institute InfoSec Reading Room*, SANS Institute, (2007).

Dunlap, George W., et al., "ReVirt: Enabling Intrusion Analysis through Virtual-Machine Logging and Replay", *Proceeding of the 5th Symposium on Operating Systems Design and Implementation, USENIX Association*, ("Dunlap"), (Dec. 9, 2002).

Filiol, Eric, et al., "Combinatorial Optimisation of Worm Propagation on an Unknown Network", International Journal of Computer Science 2.2 (2007).

Goel, et al., Reconstructing System State for Intrusion Analysis, Apr. 2008 SIGOPS Operating Systems Review, vol. 42 Issue 3, pp. 21-28.

Hjelmvik, Erik, "Passive Network Security Analysis with NetworkMiner", (*IN*)*SECURE*. Issue 18, (Oct. 2008), pp. 1-100.

Kaeo, Merike, "Designing Network Security", ("*Kaeo*"), (Nov. 2003).

Kim, H., et al., "Autograph: Toward Automated, Distributed Worm Signature Detection", *Proceedings of the 13th Usenix Security Symposium (Security 2004)*, San Diego, (Aug. 2004), pp. 271-286.

King, Samuel T., et al., "Operating System Support for Virtual Machines", ("*King*").

Krasnyansky, Max, et al., *Universal TUN/TAP driver*, available at https://www.kernel.org/doc/Documentation/networking/tuntap.txt (2002) ("*Krasnyansky*").

Kreibich, C., et al., "Honeycomb-Creating Intrusion Detection Signatures Using Honeypots", *2nd Workshop on Hot Topics in Networks (HotNets-11)*, Boston, USA, (2003).

Kristoff, J., "Botnets, Detection and Mitigation: DNS-Based Techniques", *NU Security Day*, (2005), 23 pages.

Liljenstam, Michael et al., "Simulating Realistic Network Traffic for Worm Warning System Design and Testing", *Institute for Security Technology studies, Dartmouth College*, ("Liljenstam"), (Oct. 27, 2003).

Marchette, David J., "Computer Intrusion Detection and Network Monitoring: A Statistical Viewpoint", ("*Marchette*"), (2001).

Margolis, P.E., "Random House Webster's 'Computer & Internet Dictionary 3rd Edition'", Isbn 0375703519, (Dec. 1998).

Moore, D., et al., "Internet Quarantine: Requirements for Containing Self-Propagating Code", *INFOCOM*, vol. 3, (Mar. 30-Apr. 3, 2003), pp. 1901-1910.

Morales, Jose A, et al., "Analyzing and exploiting network behaviors of malware.", *Security and Privacy in Communication Networks, Springer Berlin Heidelberg*, 2010, 20-34.

Natvig, Kurt, "Sandboxii: Internet", *Virus Bulletin Conference*, ("Natvig"), (Sep. 2002).

NetBIOS Working Group. Protocol Standard for a NetBIOS Service on a TCP/UDP transport: Concepts and Methods. STD 19, RFC 1001, Mar. 1987.

(56) References Cited

OTHER PUBLICATIONS

Newsome, J., et al., "Dynamic Taint Analysis for Automatic Detection, Analysis, and Signature Generation of Exploits on Commodity Software", *In Proceedings of the 12th Annual Network and Distributed System Security, Symposium (NDSS '05)*, (Feb. 2005).

Newsome, et al., "Polygraph: Automatically Generating Signatures for Polymorphic Worms", *In Proceedings of the IEEE Symposium on Security and Privacy*, (May 2005).

Nojiri, D., et al., "Cooperation Response Strategies for Large Scale Attack Mitigation", *DARPA Information Survivability Conference and Exposition*, vol. 1, (Apr. 22-24, 2003), pp. 293-302.

Peter M. Chen, and Brian D. Noble, "When Virtual Is Better Than Real, Department of Electrical Engineering and Computer Science", *University of Michigan ("Chen")*.

Silicon Defense, "Worm Containment in the Internal Network", (Mar. 2003), pp. 1-25.

Singh, S., et al., "Automated Worm Fingerprinting", *Proceedings of the ACM/USENIX Symposium on Operating System Design and Implementation*, San Francisco, California, (Dec. 2004).

Spitzner, Lance, "Honeypots: Tracking Hackers", (*"Spizner"*), (Sep. 17, 2002).

Thomas H. Ptacek, and Timothy N. Newsham, "Insertion, Evasion, and Denial of Service: Eluding Network Intrusion Detection", *Secure Networks*, ("Ptacek"), (Jan. 1998).

Venezia, Paul, "NetDetector Captures Intrusions", *InfoWorld Issue27*, ("Venezia"), (Jul. 14, 2003).

Whyte, et al., "DNS-Based Detection of Scanning Works in an Enterprise Network", *Proceedings of the 12th Annual Network and Distributed System Security Symposium*, (Feb. 2005), 15 pages.

\* cited by examiner

DETECTING BOOTKITS RESIDENT ON COMPROMISED COMPUTERS

BACKGROUND

1. Field of the Invention

The invention relates generally to computer security and more particularly to detecting malicious software operating in computers and other digital devices.

2. Related Art

Malicious software, or malware for short, may include any program or file that is harmful by design to a computer. Malware includes computer viruses, worms, Trojan horses, adware, spyware, and any programming that gathers information about a computer or its user or otherwise operates without permission. Owners of the computers are often unaware that these programs have been added to their computers and are often similarly unaware of their function.

Malicious network content is a type of malware distributed over a network via websites, e.g., servers operating on a network according to Hypertext Transfer Protocol ("HTTP") or other well-known standard. Malicious network content distributed in this manner may be actively downloaded and installed on a computer, without the approval or knowledge of its user, simply by the computer accessing the website hosting the malicious network content (the "malicious website"). Malicious network content may be embedded within objects associated with web pages hosted by the malicious website. Malicious network content may also enter a computer on receipt or opening of email. For example, email may contain an attachment, such as a PDF document, with embedded malicious executable programs. Furthermore, malicious content may exist in files contained in a computer memory or storage device, having infected those files through any of a variety of attack vectors.

Various processes and devices have been employed to prevent the problems associated with malicious content. For example, computers often run antivirus scanning software that scans a particular computer for viruses and other forms of malware. The scanning typically involves automatic detection of a match between content stored on the computer (or attached media) and a library or database of signatures of known malware. The scanning may be initiated manually or based on a schedule specified by a user or system administrator associated with the particular computer. Unfortunately, by the time malware is detected by the scanning software, some damage on the computer or loss of privacy may have already occurred, and the malware may have propagated from the infected computer to other computers. Additionally, it may take days or weeks for new signatures to be manually created, the scanning signature library updated and received for use by the scanning software, and the new signatures employed in new scans.

Moreover, anti-virus scanning utilities may have limited effectiveness to protect against all exploits by polymorphic malware. Polymorphic malware has the capability to mutate to defeat the signature match process while keeping its original malicious capabilities intact. Signatures generated to identify one form of a polymorphic virus may not match against a mutated form. Thus polymorphic malware is often referred to as a family of virus rather than a single virus, and improved antivirus techniques to identify such malware families is desirable.

Another type of malware detection solution employs virtual environments to replay content within a sandbox established by virtual machines (VMs) that simulates a target operating environment. Such solutions monitor the behavior of content during execution to detect anomalies and other activity that may signal the presence of malware. One such system sold by FireEye, Inc., the assignee of the present patent application, employs a two-phase malware detection approach to detect malware contained in network traffic monitored in real-time. In a first or "static" phase, a heuristic is applied to network traffic to identify and filter packets that appear suspicious in that they exhibit characteristics associated with malware. In a second or "dynamic" phase, the suspicious packets (and typically only the suspicious packets) are replayed within one or more virtual machines. For example, if a user is trying to download a file over a network, the file is extracted from the network traffic and analyzed in the virtual machine using an instance of a browser to load the suspicious packets. The results of the analysis constitute monitored behaviors of the suspicious packets, which may indicate that the file should be classified as malicious. The two-phase malware detection solution may detect numerous types of malware, and even malware missed by other commercially available approaches. The two-phase malware detection solution may also achieve a significant reduction of false positives relative to such other commercially available approaches. Otherwise, dealing with a large number of false positives in malware detection may needlessly slow or interfere with download of network content or receipt of email, for example. This two-phase approach has even proven successful against many types of polymorphic malware and other forms of advanced persistent threats.

In some instances, malware may take the form of a bootkit, also known as a kernel rootkit. As used herein, the term 'bootkit' refers to malicious code that installs itself in a boot record of the kernel of an operating system of a compromised computer without the knowledge or authority of the infected computer's user. The infected boot record may be the master boot record, partition boot record, boot loader, or volume boot record. A bootkit may actively hide its presence from administrators by subverting standard operating system functionality. Moreover, a bootkit is inherently hard to detect because it may be executed before the operating system and may subvert operating system functionality to hide its presence. For example, bootkits may be able to hook and bypass operating system routines, initialization (processor mode switch), and security checks (integrity, code-signed, etc.). Bootkits may create a hidden file system within the infected computer, in which it can hide other malware and/or copies of infected files.

Generally speaking, a bootkit functions at a fundamental level of operation of a computer, associated with the kernel of its operating system. Known operating systems communicate with an external device such as a disk controller, peripheral device and other hardware through the use of an electronic signal called an interrupt. For example, when an application sends a system call seeking to read or write to a hard disk, it issues an interrupt. Then, an interrupt handler function of the operating system normally handles and completes the interrupt. A bootkit installed in the operating system may hook (intercept) the interrupt and/or related kernel functions in order to modify the way the interrupt is handled. The bootkit may place an internal address in the system service descriptor table (SSDT) of a Windows® operating system or the system call table (SCT) of a Linux® operating system in order to handle an interrupt itself instead of the original handler. Indeed, a bootkit may modify data structures in a Windows' kernel using a method known as direct kernel object modification (DKOM). This can permit the bootkit to rewrite a portion of code of the operating system, for example, when the kernel loads to handle the interrupt. The rewritten code may allow the bootkit to bypass or modify integrity testing and other security protection mechanisms, and even bypass advanced operating protection systems, such as patch guard, and thereby remain concealed. Even full disk encryption is to no avail in protecting a compromised computer since, even if all other data on a boot-up drive is encrypted, the boot sequence located in the master boot record typically cannot be encrypted.

It has been suggested that a defense against bootkit attacks is the prevention of unauthorized physical access to the system, but this is impractical in today's networked world. Moreover, virus scanning and next generation firewall technology have not prevented advanced forms of bootkits from gaining access to operating system kernels. Recently, operating systems themselves have incorporated counter-measures to thwart the threat of bootkits. For example, 64-bit versions of Microsoft Windows implement mandatory signing of all kernel-level drivers in order to make it more difficult for untrusted code to execute with the highest privileges in a computer, and implement kernel patch protection. However, bootkits are also rapidly evolving to circumvent such counter-measures.

Further enhancement to malware detection effectiveness is desirable of course, particularly as malware developers continue to create new forms of exploits, including more sophisticated bootkits, which can have potentially serious impact on computer and network infrastructure.

BRIEF DESCRIPTION OF THE DRAWINGS

The invention will be more fully understood with reference to the following detailed description in conjunction with the drawings, of which.

DESCRIPTION OF ILLUSTRATIVE EMBODIMENTS

Introduction

Figure 1:
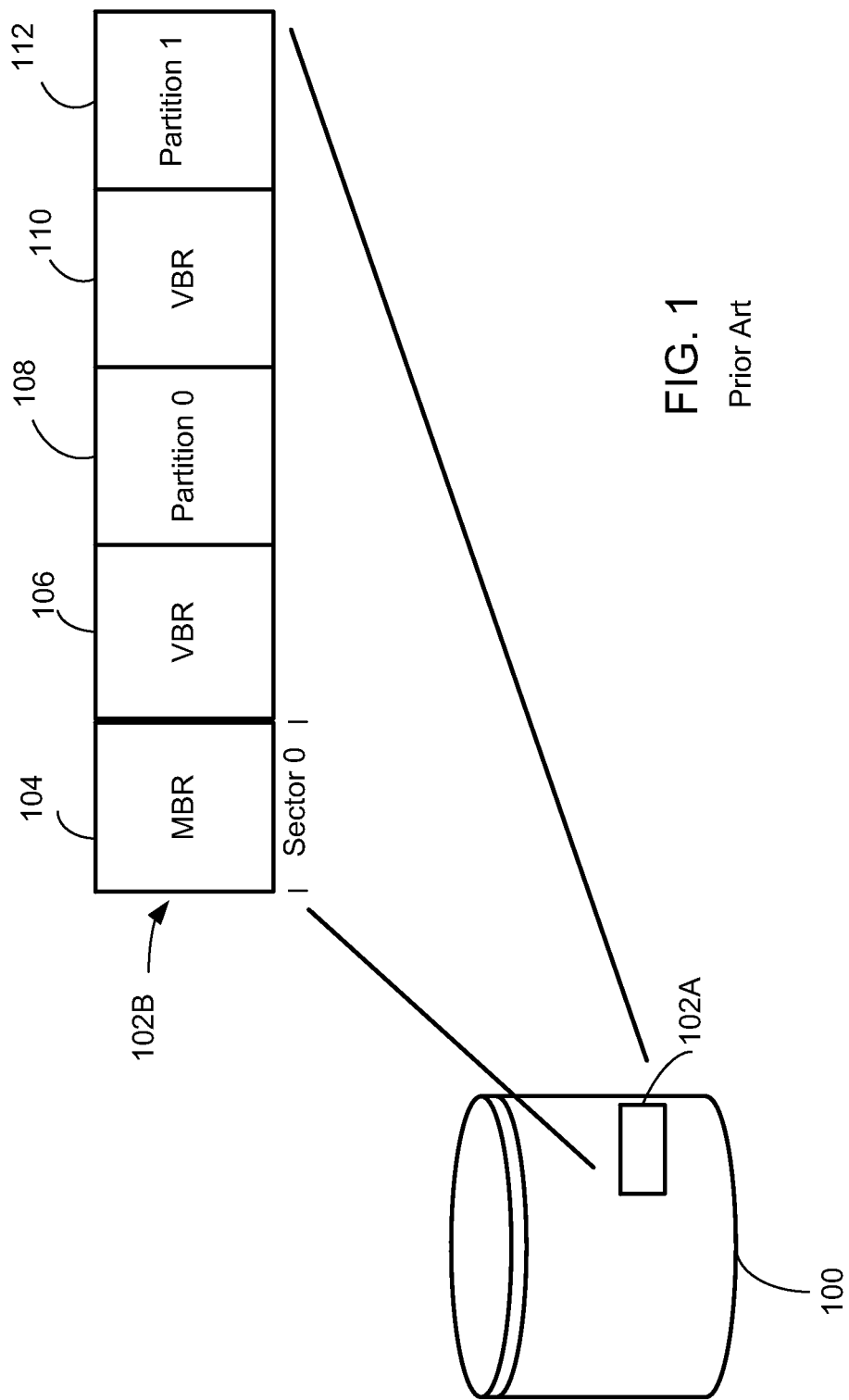
FIG. 1 is a block diagram of a bootable disk drive with a boot record in a format illustrative of the prior art.

Generally speaking, a bootkit is a type of (or part of) an active infiltration attack, often operating in a two-step process. The first step is infection, which may take the form of a typically small package of malicious code (malware) being injected into a computer, whose function is to compromise the infected device. The second step involves the resident bootkit performing malicious activity. Embodiments of the invention are designed to detect certain types of malicious activity of bootkits. As used herein a "computer" is any electronic device having a processor for running an operating system, which may include, without limitation, notebook computers, desktop computers, tablets, smart phones and other smart devices and equipment, and often employs a network interface for communication over a network, such as, for example, the Internet. The terms "computer" and "computer systems" may be construed as synonymous as used throughout this specification, unless context demands otherwise.

Embodiments of the invention detect bootkits resident on a computer by detecting a change or attempted change to contents of boot locations of persistent storage, where any detected change or attempted change represents evidence of a resident bootkit and in response, an alert regarding the evidence of a resident bootkit may be issued. Some embodiments may monitor computer operations seeking to change the content of boot locations of persistent storage, where the monitored operations may include API calls performing, for example, WRITE, READ or APPEND operations with respect to the contents of the boot locations. Other embodiments may generate a baseline hash of the contents of the boot locations at a first point of time and a hash snapshot of the boot locations at a second point of time, and compare the baseline hash and hash snapshot where any difference between the two hash values constitutes evidence of a resident bootkit. Yet other embodiments may perform bootkit detection using both techniques to better assure detection of bootkits.

As used herein, boot locations are areas (e.g., addressable locations) of persistent storage that store contents (including executable code and data) required to load an operating system for execution in any execution environment, including a virtual execution environment as provided by a virtual machine. These shall sometimes be referred to as the "boot locations" and the "boot content." The boot locations may store the master boot record. In some embodiments, the boot locations may store a master boot record ("MBR") and one or more volume boot records ("VBRs"). Some embodiments monitor any changes or attempted changes to only the boot locations containing the MBR, and others monitor any changes or attempted changes to both the MBR and one or more of the VBR.

Embodiments of the invention may perform an integrity check of boot content to detect bootkit activity. An integrity checker initially generates and stores, preferably in persistent storage, a baseline hash of the record. Thereafter, the integrity checker generates one or more additional hashes of the MBR taken over time. The hash baseline is used as a basis or standard for comparison with each subsequent hash instance, called the hash snapshot. Where plural snapshots are taken, they may be generated on a periodic or aperiodic basis. The integrity checker compares the hash baseline with each hash snapshot. The boot content is not expected to change during normal operation of a computer. Any detected difference in the hash values is indicative of abnormal activity and thus of a resident bootkit. The reason this inference can be made is that few legitimate applications change the boot content. Moreover, these applications are not typically used by ordinary users found in a commercial environment. On the other hand, malicious bootkits frequently make changes to the boot content. Accordingly, the integrity checker may generate a bootkit alert if any difference is detected, and may report the details of the malware attack to an administrator or user.

The proposed techniques may be implemented to detect bootkits in computers in use, for example, within enterprises, by performing the methods described herein (or select steps thereof), for example, as background processes during normal computer operation as part of an on-going malware detection/protection program. Where only select steps are performed during normal operation of the computers, the remaining steps may be performed by a security station, which may issue an alert to IT or security personnel. Accordingly, the proposed techniques may be implemented in network endpoints and standalone computers, for example, by incorporation of bootkit detection agents into their respective operating systems or into utilities or other computer programs installed thereon.

In alternative embodiments, the proposed techniques may be implemented in a bootkit detection appliance or malware detection system, which may detect changes or attempted changes caused by samples (e.g., files or network content, for example) that may be malicious and contain bootkit code. They may also be implemented in the two-phase malware detection solutions, as described above, or in other malware detection systems, with or without virtual execution environments. As such, the invention may be deployed to protect computer systems in an enterprise environment or to test known or unknown samples in diagnostic or forensic labs.

For a computer running a virtual machine, embodiments may implement the invention partially within a guest image under the control of a hypervisor or VMM, and partially within the virtual machine itself. Additionally, embodiments may implement the invention partially within the virtual machine and its guest image, and partially within an external security station or malware detection system.

Bootkit Detection System Architecture and Operation

FIG. 1 depicts a bootable, partitioned hard disk drive 100, in which is stored a master record 102A. The master record 102A is shown in an expanded view at 102B, illustrating principles of a prior art approach to bootable disk formatting. In the illustrated example, the MBR is the first sector 104, which may hold boot code and a partition table for locating the other fields of the master record within logical partitions; a volume boot record (VBR) as the second sector 106, which may hold a disk parameter block and volume boot code and precedes a partition in the boot record; a partition 0 for storing data and computer instructions as a third sector 108; another VBR as a fourth sector 110; and another partition 1, again for storing data and computer instructions as a fifth sector 112. Unlike the plural VBRs 106, 110 contained in the illustrated master record 102A, there is only one MBR 104 on the bootable drive 100, and this is typical for any known bootable mass storage device, whether a fixed disk or removable drive, for the major operating systems, such as Windows®, UNIX, and LINUX, to name a few.

As noted, in order to be readily locatable, the MBR is always the first sector of the drive, though the precise format and structure of the boot record depends on the operating system type and version. Sometimes the term MBR is used to describe the first sector of a bootable disk, and, at other times, it refers to the boot content contained therein, and sometimes it is referred to as the master boot block or master partition boot sector. Normally, IBM Personal Computers use 512-byte sectors, real or emulated, and the MBR is thus up to 512 bytes in length.

Where an operating system is to be loaded within a virtual machine, a virtual bootable disk or other persistent storage is typically used rather than a physical disk. Nonetheless, the principles just discussed apply: the MBR may be located within sector 0 of the virtual disk, and, upon the disk being mounted, sector 0 of the virtual bootable disk can be read, its partition table accessed to identify, for example, the locations of the VBRs, and its boot code executed. The same is true of flash drives, which typically have analogous formats to typical SCSI disk drives, and thus its MBR and partition table may be found in its sector 0.

During operation, after a computer is powered on, its basic input/output system (BIOS) typically performs a power-on self test (POST) and initializes the system. Next, the BIOS copies the first sector of a bootable drive containing the MBR into memory and passes control of the computer to the boot code (executable instructions) contained therein. Execution of the boot code accesses the partition table, which tells the computer how the hard drive is partitioned, and how to load the operating system. In other words, the boot code uses the partition table to identify a configured bootable partition on the drive, which permits the system to load and execute its VBRs.

Figure 2:
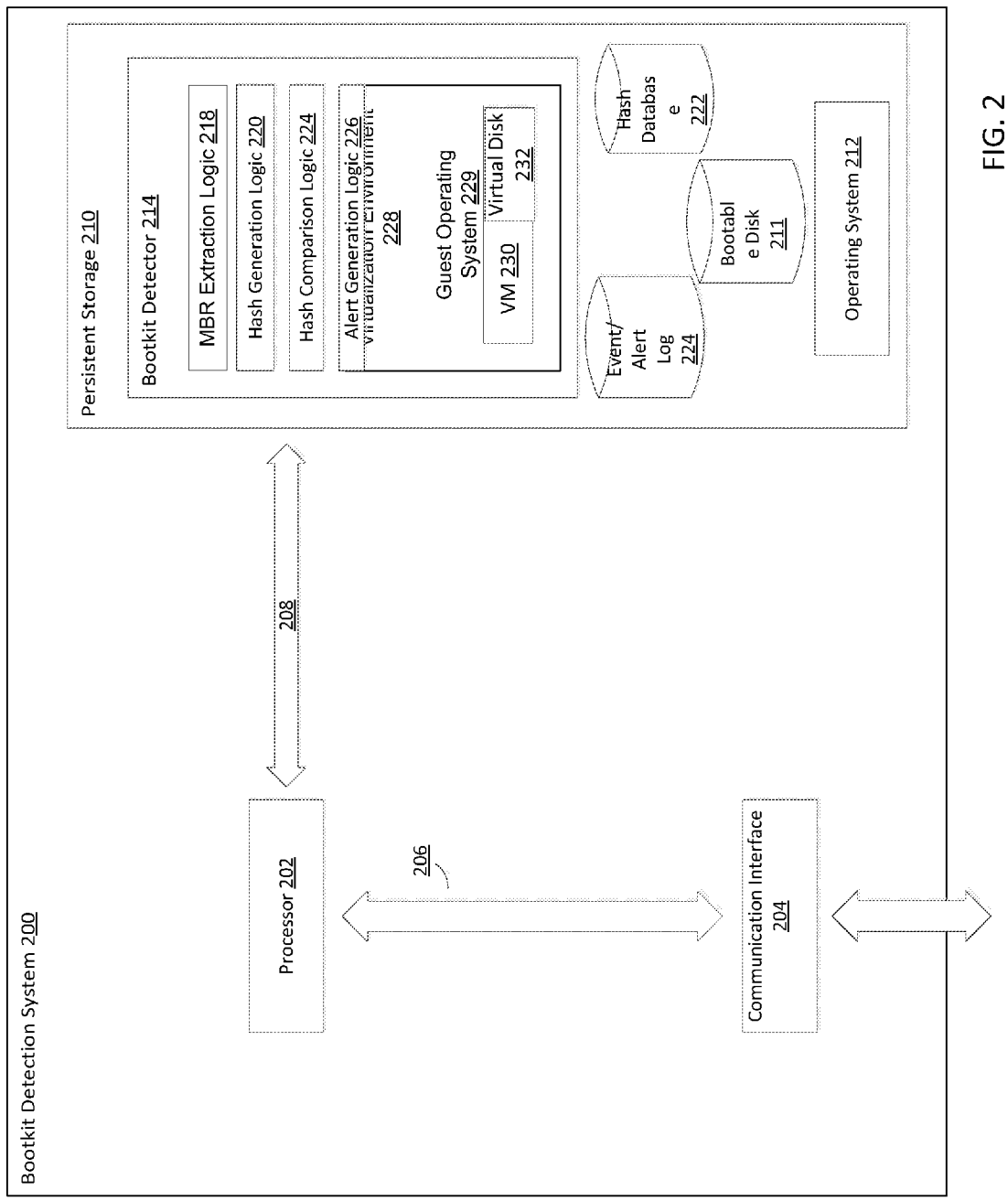
FIG. 2 is a block diagram of a bootkit detection system, in accordance with an illustrative embodiment of the invention employing a virtual environment.

FIG. 2 depicts an illustrative architecture of a bootkit detection system 200, which is designed to detect bootkits installed on a compromised computer. The system 200 may even detect 'zero day' malware attacks. The term "zero day" is used to denote malware that has not been previously encountered and are previously unknown. The bootkit detection system 200 has one or more processors 202 that are coupled to communication interface logic 204 via a first transmission medium 206. Communication interface logic 204 enables the bootkit detection system 200 to monitor network traffic, for example, over a communication link, such as network 212, 214, 216 of FIG. 2A. Communication interface logic 210 may also permit communications from the bootkit detection system 200 directly or indirectly over a communication link, such as a private and/or public network, with other electronic devices. According to one embodiment, communication interface logic 204 may be implemented as a physical interface including one or more ports for wired connectors. Additionally, or in the alternative, communication interface logic 204 may be implemented with one or more radio units for supporting wireless communications with other electronic devices over a wireless network.

Processor 202 is coupled via transmission medium 208 to a persistent storage 210. Persistent storage 210 includes a bootable disk 211, which permits processor 202 to boot up, as described above. Persistent storage 210 also includes an operating system 212 and a bootkit detector 212, both of which may take the form of executable computer program code. The processor 202 may execute the operating system 212 natively, and the bootkit detector 214 may run as an application over the operating system 212. For purposes of the following discussion, we will refer to the MBR as an illustrative example of the boot content, though this should not be construed as limiting the boot content to only the MBR unless otherwise indicated. The bootkit detector 212 may include an MBR extraction logic 218, which is configured to access the master record from a bootable disk (e.g., a virtual disk) to extract the MBR therefrom (and possibly other sectors, depending on the embodiment, though the embodiment will be discussed in terms of the MBR); a generation logic 220, which is configured to generate an MBR-based hash signature and store it in a hash log or database 222; a hash comparison logic 224, which is configured to compare a first or baseline hash signature with a second or snapshot hash signature; and an alert logic 226, which is configured to issue an alert if the comparison logic 224 determines that the MBR has been changed in that it finds a difference between the hash values of the baseline and snapshot signatures. In some embodiments, the bootkit detector 214 may execute potentially malicious samples within a virtualization environment 228 having a guest operating system 229, and possibly a computer application, such as, for example, a browser or email application (not shown), running within a virtual machine 230. During execution, the processor 202 may execute an operating system instance 229 within an instance of the virtual machine 228, which runs over the operating system 212.

Figure 3:
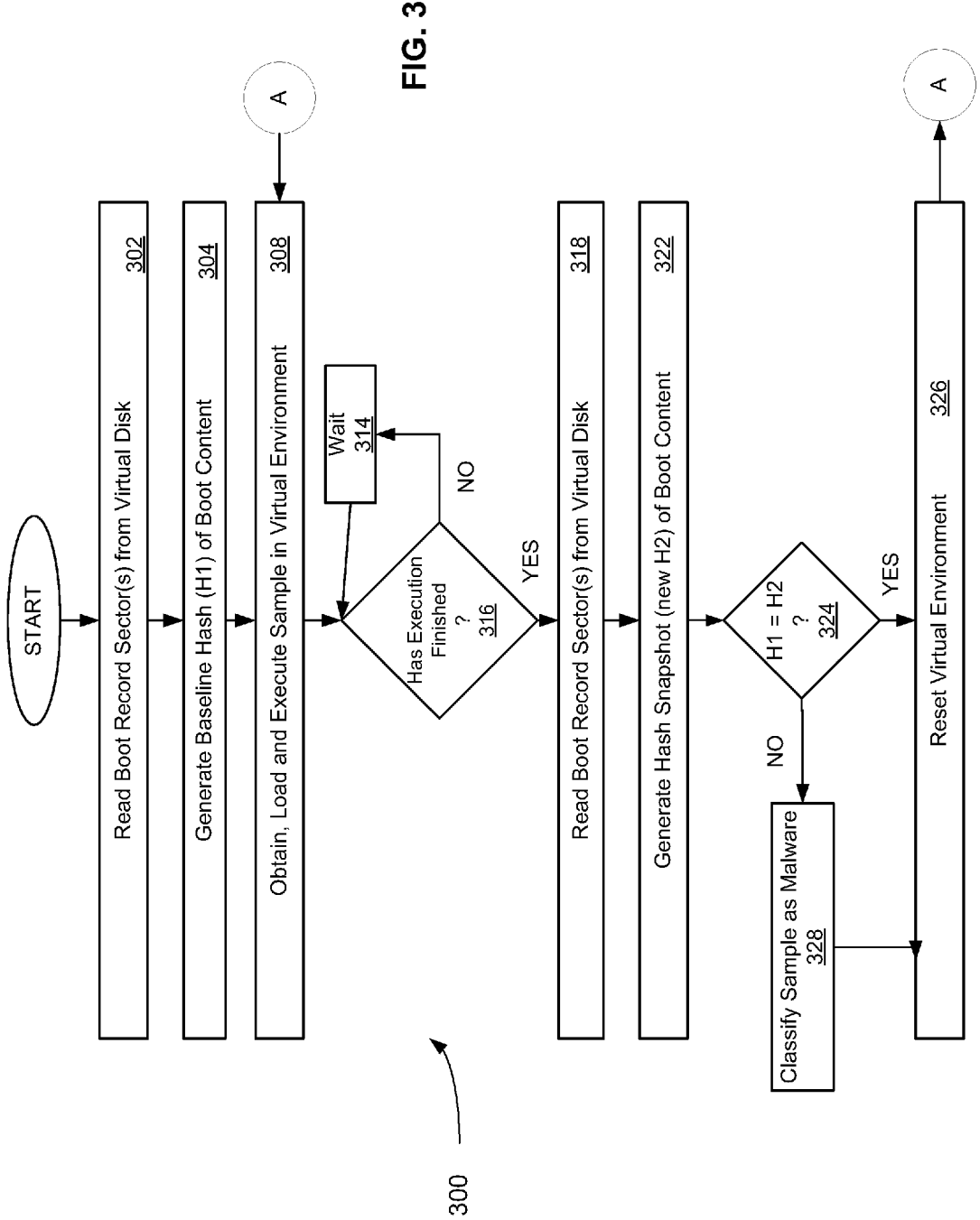
FIG. 3 is a flow chart of a bootkit detection method using a virtual environment, in accordance with an illustrative embodiment of the invention, which may be practiced by the system of FIG. 2.

FIG. 3 depicts a method 300 for detecting malicious bootkits using logic such as, for example, the bootkit detector 212 of FIG. 2, in accordance with an embodiment of the invention. The method 300 starts, in step 302, where logic reads one or more boot record sectors from a bootable disk. In accordance with a preferred implementation, the one or more boot record sectors contain the MBR and possibly, depending on the embodiment, other information. In step 304, logic generates a baseline hash (H1) at a point of time ($t_1$) of the boot content in step 302. In this illustrative case, where the MBR is the boot content, the baseline hash is generated from only the MBR. The baseline hash may be calculated using any a variety of well-known hashing algorithms, such as, for example, MD5. The baseline hash serves as a signature of the MBR as of a time preferably before the virtual disk containing the MBR may have been exposed to any malicious bootkit. The baseline hash is calculated and stored, for example, during installation of the guest operating system 229 of FIG. 2, and again immediately following each update thereof, including, without limitation, each new versions and service pack. Each new baseline hash may be stored in a tamper-protected manner as a "golden image," for example, in persistent storage within the detection system 200 of FIG. 2.

In step 308, logic obtains, loads, and executes a sample within a virtual environment to be tested to determine whether the sample contains a malicious bootkit. Where the sample is executable code it may be run as a computer program or application over the guest image of the operating system in the virtual environment. Where the sample constitutes an object (such as a PDF document), which is itself not executable even though it may contain embedded executables, the sample may be loaded by a suitable computer program or application (such as, in this example, a PDF reader) running over the guest operating system and together constituting a guest image executed by a virtual machine.

Next, in step 316, logic determines whether execution of the sample has finished. If it has not, then, in step 314, method 300 waits a predetermined or dynamically set period of time (where dynamically set, e.g., based on experience in executing such samples within the guest image), before repeating step 316. When the logic of step 316 determines that execution has finished, in step 318, logic reads one on more boot record sectors from the bootable disk, and, for example, the same MBR-containing sector(s) as read to generate the baseline hash signature (H2). In step 322, logic generates a hash snapshot based on the read boot content, in this example, the MBR, at a point of time ($t_2$), which together with baseline signature H1, will serve as a basis for comparison of the MBR over time ($t_1$ to $t_2$). In some embodiments, snapshot hashes may be taken from time to time during the execution of the sample. In step 324, logic determines whether the baseline hash signature is the same as the snapshot hash signature. It may perform this comparison simply by subtracting one hash value from the other. If the difference is any value other than zero, then H1 is not equal to H2. This result would indicate that the MBR has been changed at some point in time between the generation of the baseline hash and the snapshot hash (that is, between $t_1$ and $t_2$). This, in turn, would indicate that a mechanism must have caused that change in the MBR, and that mechanism may very well be a bootkit. If the baseline hash is equal to the snapshot hash, in step 326, logic may be employed to reset the virtual environment to ready it for a next sample to be tested. As such, the method 300 may return to step 308. On the other hand, if the baseline hash is not equal to the snapshot hash, in step 328, logic classifies the sample as malicious, that is to say, as likely (that is, having a high probability of) containing a bootkit.

Figure 4:
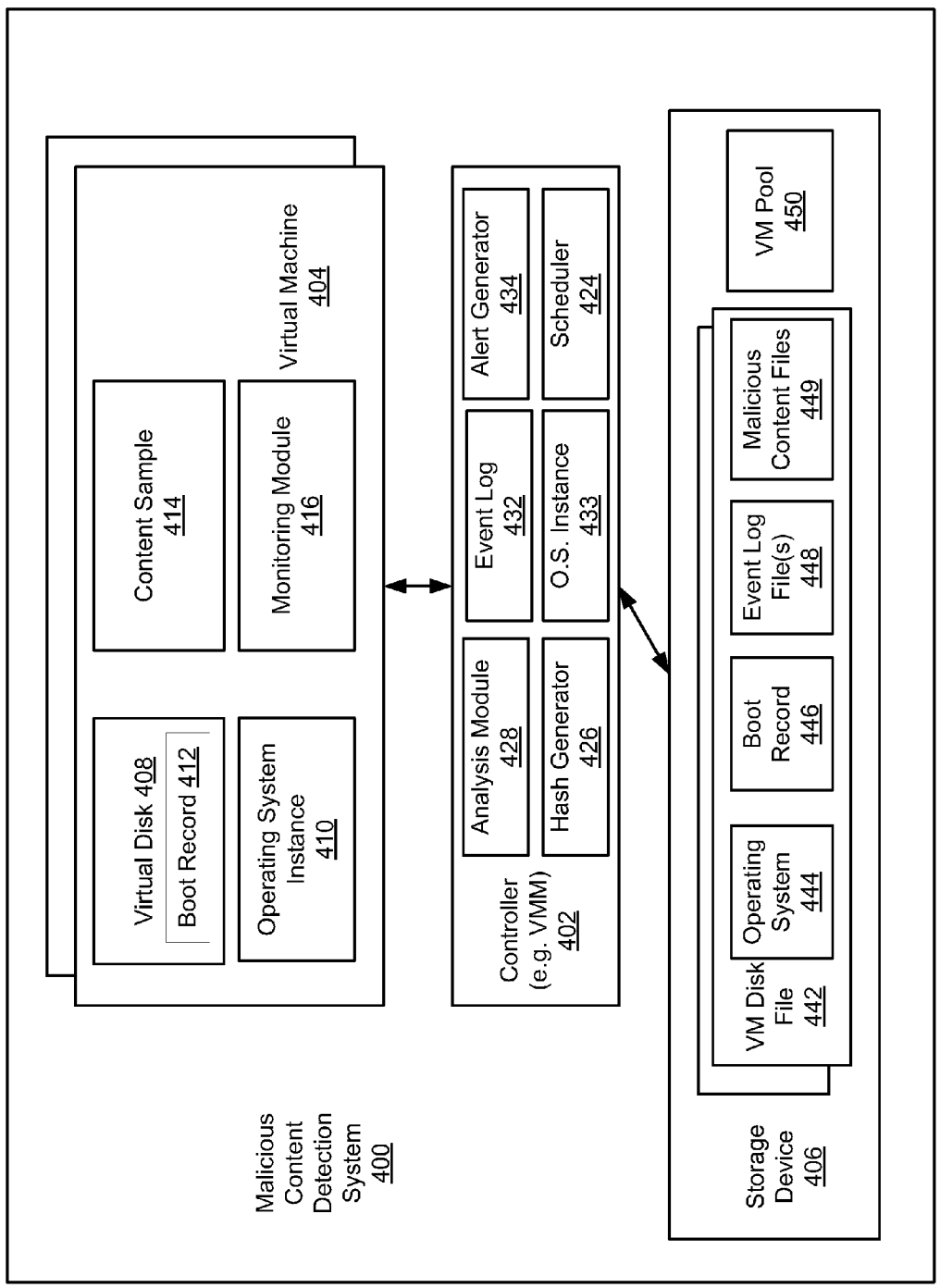
FIG. 4 is a block diagram of a malicious content detection system, in accordance with an illustrative embodiment of the invention employing a virtual environment, which may detect malware including bootkits.

FIG. 4 is a block diagram illustrating a malicious content detection system according to one embodiment of the invention, which may implement the method 300 of FIG. 3, for example. Referring to FIG. 4, system 400 includes a controller 402 to manage or control one or more virtual machines (VMs) 404 (also referred to as a sandboxed operating environment or simply a sandbox), where content (in this case, computer instructions and data) associated with VMs 404 are stored in storage device 406 in a form of VM disk files 442.

Controller 402 may be implemented as part of a VM monitor or manager (VMM), also referred to as a hypervisor for managing or monitoring VMs. The controller 402 may execute an operating system instance 433 of host operating system (OS) 444, which is stored in storage device 406. VM 404 may host a guest OS, depicted as operating system instance 410, which is different from the host OS 433 of the controller 402. The host OS 433 and the guest OS 410 may be the same type of operating systems or different types of operating systems (e.g., Windows™, Linux™, Unix™, Mac OS™, iOS™, etc.) or different versions thereof. A VM is a simulation of a computer (abstract or real) that is usually different from the target computer (where it is being simulated on). Virtual machines may be based on specifications of a hypothetical computer or emulate a computer architecture and functions of a real world computer. A virtual machine referred to herein can be any type of virtual machines, such as, for example, hardware emulation, full virtualization, para-virtualization, and operating system-level virtualization virtual machines.

On initial execution of the virtual machine 404, a processor or processors (not shown in this figure) of the controller 402 accesses a virtual disk 408 provided by the virtual machine 404 to obtain one or more sectors of a boot record 412, preferably the sector(s) containing the boot content, as stored thereon. It should be noted that boot record 412 is isolated from the boot record 446 associated with operating system 444. A hash generator 426 included in the controller 402, generates a hash of boot content obtained by the controller 402 from the virtual disk 408, and, for example, a hash of the MBR. That hash is the baseline hash serving as the baseline signature of the MBR for later testing of content samples, including the content sample 414, by the malicious content detection system 400. The baseline hash signature may be stored in the event log 432. In some embodiments, the baseline hash signature may be stored as a heavily obfuscated value under kernel software protection.

According to one embodiment, when a content sample 406 to be tested as to whether it may contain a bootkit is received for a dynamic content analysis (as opposed to be a static content analysis described below), a scheduler 424 of controller 402 is configured to identify and select a VM, in this example VM 404, from a VM pool 450 that has been configured to closely simulate a target operating environment (e.g., particular version of an OS with particular versions of certain software installed therein) in which the content sample 414 is to be analyzed. The scheduler 424 then launches VM 404 in which monitoring module 416 is running and configured to monitor activities and behavior of content sample 414. In addition, monitoring module 416 maintains a persistent communication channel with analysis module 428 of controller 402 to communicate certain events or activities of content sample 414 during the execution.

After the content sample 414 is executed, or at one or more times during its execution depending on the embodiment, the monitoring module 416 may trigger the generation by the hash generator 426 of a new hash value for the boot content, that is, the same content involved in the baseline hash, for example, the MBR of the boot record 412, each new hash value constituting a hash snapshot signature. Each hash snapshot signature may be stored in the event log 432. Monitoring module 416 is configured to send a message via the communication channel to analysis module 428 to indicate completion of execution of the content sample 414.

In response to the generation of each hash snapshot signature, or during a designated analysis phase after the generation of one or more hash snapshot signatures for the content sample 414, the analysis module 428 may compare the baseline hash signature with the one or more snapshot signatures. Any difference between the baseline signature and any of the snapshot signatures is considered an indicator of a bootkit being contained in the content sample 414. As a result, the analysis module 428 generates a message indicative of the presence of the bootkit, which may also contain information regarding any other behavior detected by the monitoring module 416 during execution of the content sample 414 that constitutes an anomaly relative to normal behavior during execution and thus would be indicative of other malicious activity by the content sample 414. The message is sent to the event log 432, which records the message contents as an event triggered by content sample 414. Event log 432 records events that have been selectively monitored and detected by monitoring module 416. Content of the event log 432 may be stored in a persistent storage as part of event log file(s) 448 of VM disk file 442 associated with VM 404. The recorded events may be analyzed by analysis module 428 based on a set of rules or policies (not shown) to determine whether content sample 414 is likely malicious (e.g., high probability of malicious) and/or should be declared as malicious. In the event that the content sample 414 is found to be malicious, that is, that it contains at least a bootkit (if not also other malware, depending on the detected anomalous activities), the content sample 414 may be stored in the malicious content files 4490 the VM disk file 442. In addition, and alert generator 434 may issue an alert so that a user or administrator may take appropriate steps in light of the malicious content being discovered.

Figure 5:
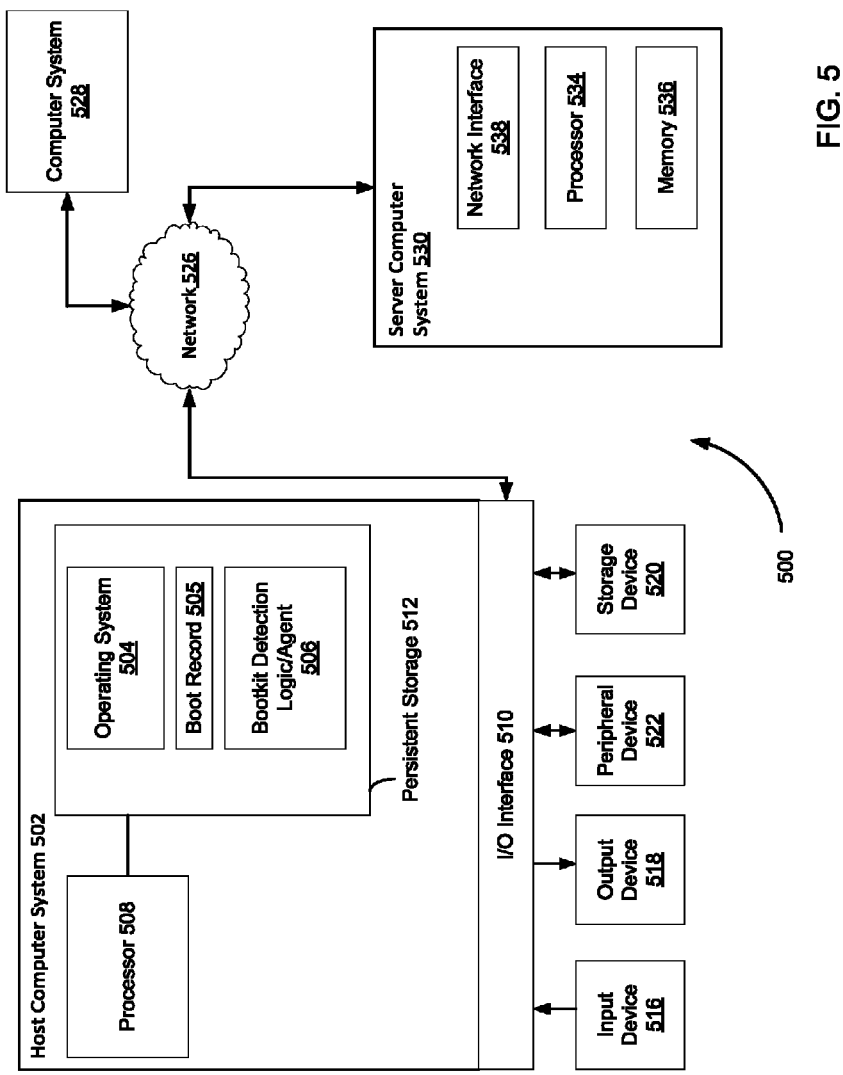
FIG. 5 is a block diagram of a bootkit detection agent incorporated into an endpoint of a networked computer system, in accordance with an alternative embodiment of the invention.

Now, an alternative embodiment of the invention will be described involving detecting bootkits, for example, on network endpoints. FIG. 5 is a block diagram of a client-server system 500 configured as a host computer system 502, e.g., a first computer system, in accordance with one embodiment of the present invention. Host computer system 502, sometimes called a client or user device, typically includes a central processing unit (CPU), e.g., a processor 508, an input/output (I/O) interface 510, and a persistent storage 512. In one embodiment, persistent storage 512 includes an operating system 504, a boot record 505, and a bootkit detection logic or agent 506.

The I/O interface 510 of host computer system 502 may be connected (by cable or wireless connection) to standard devices, such as one or more input devices 516 (e.g., a keyboard, a mouse), output devices 518 (e.g., a display device, a printer), and as well as, one or more standard input/output (I/O) devices 524 (e.g., touch screen, a USB memory device, compact disk (CD) or DVD drive), storage devices 520, and other peripheral devices 522, and, all of which may be operable via device drivers installed in the operating system 504.

The I/O interface 510 of host computer system 502 is also coupled by the network 526 to a server system 530 of client-server system 500. Network 526 may be any network or network system, including a proprietary network and the Internet, or combinations thereof. Server system 530 may includes a processor 534, a persistent storage 536, and a network interface 538. Due to that connection between the host computer system 502 and the network 526, the host computer system 502 may be regarded as a network endpoint, to which and from which network communications are sent.

Further, host computer system 502 is also coupled by network 526 to a computer system 528, such as an attacker computer system, of client-server system 500. The attacker computer system 528 may have injected a bootkit into the host computer system 502. In one embodiment, computer system 528 is similar to host computer system 502 and, for example, including a central processing unit, an input output (I/O) interface, a persistent storage and one or more of the other devices described above, or may be configured as a server computer system similar to server computer system 530. The various hardware components of computer system 528 are not illustrated to avoid detracting from the principals of the invention. The particular type and configuration of host computer system 502, computer system 528, and server system 530 are not essential to the present invention.

In one embodiment of the invention, the bootkit detection agent 506 is stored in memory 512 of host computer system 502 and executed on host computer system 502, as a utility or computer application that runs over operating system 504, as illustrated. In another embodiment, the bootkit detection system 506 may be implemented within the operating system 504, for example, as a bootkit detection module. Of course, the operating system may incorporate only some of the aspects of the bootkit detection system, such as one or more of an MBR reader, hash generator, hash comparator, and/or alert generator, to name a few. Noteworthy, these embodiments need not employ a virtual environment, but rather test for bootkit activity during normal execution of the operating system, utility or computer application within a computer system.

Figure 6:
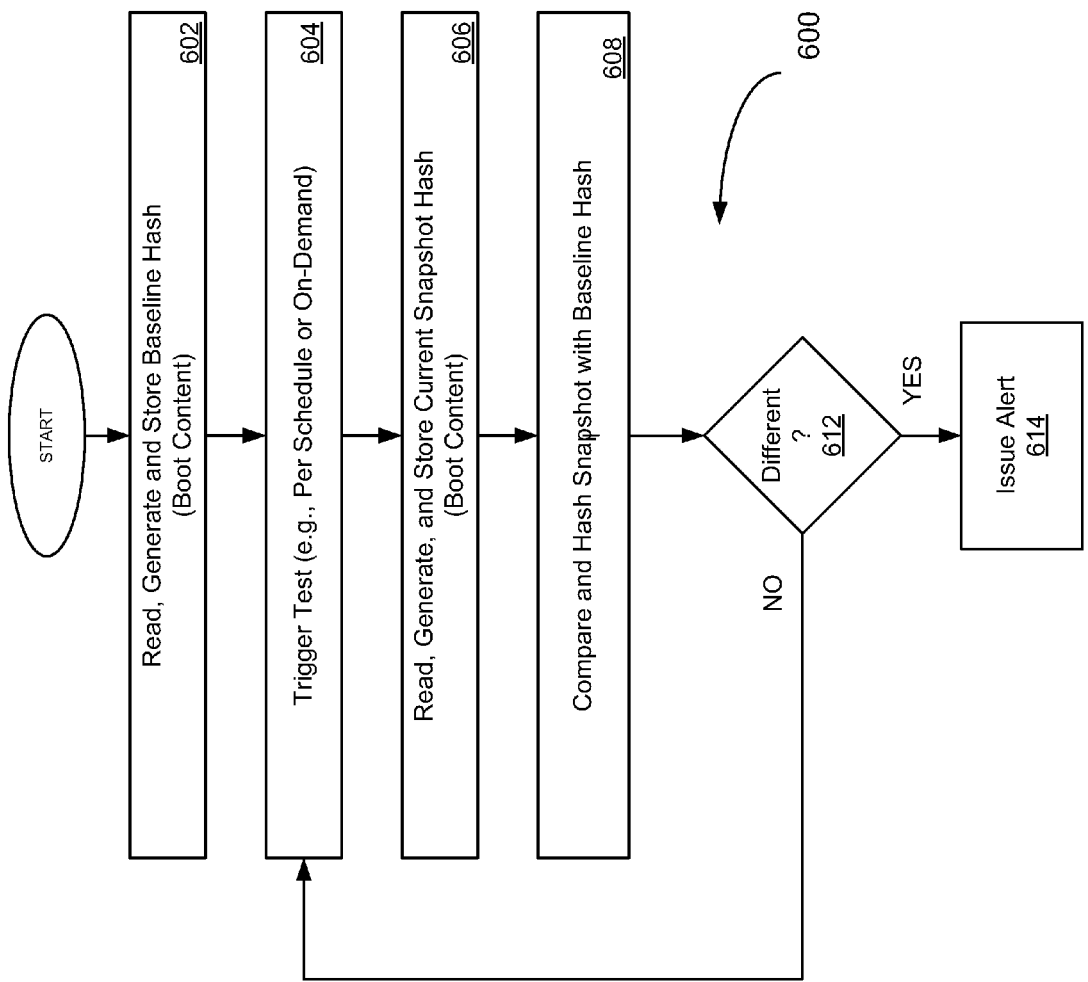
FIG. 6 is a flow chart of a bootkit detection method, in accordance with an illustrative embodiment of the invention, which may be practiced by the system of FIG. 5.

FIG. 6 depicts a method 600 for detecting malicious bootkits using logic such as, for example, the bootkit detection agent 506 of FIG. 5 implemented within a network endpoint, in accordance with an embodiment of the invention. The method 600 starts, in step 502, where logic reads one or more boot record sectors from a bootable disk, for example, boot record 505 of FIG. 5. The read boot record sectors should include the boot locations, and thus the boot code, for example, the MBR. In some embodiments, the logic reads only the MBR. The logic then generates a baseline hash (H1), which may be calculated using, for example, MD5 hashing algorithm, at a point of time ($t_1$) on information contained in the boot locations. In some embodiments, the baseline hash is based only on the MBR. The baseline hash may serve as a signature of the MBR as of a time preferably before the virtual disk containing the MBR may have been exposed to any malicious bootkit. The baseline hash is stored, for example, in persistent storage 506 of FIG. 5. Preferably, the baseline hash is stored in a trusted hardware device. In some embodiments, the baseline hash is stored in an obfuscated value, preferably under kernel software protection. In some embodiments of the invention deployed within an endpoint having a hypervisor, the baseline hash may be stored within the hypervisor. In step 604, logic triggers testing for bootkit activity, which does not require loading of a sample or use of virtual environment, as was the case for the embodiment discussed in conjunction with FIG. 3, since the testing is performed from within an endpoint for a bootkit that has taken residence therein (that is, a bootkit that is installed and being executed within the computer). The logic may trigger the testing pursuant to a schedule, such as daily or weekly, or in response to a user input for on-demand testing. In step 606, logic reads one on more boot record sectors from the bootable disk yet again, and preferably the same MBR-containing sector as read to generate the baseline hash. The logic generates a hash snapshot (H2) based on the read sector(s) at a point of time ($t_2$). The hash snapshot is stored, preferably in association with the baseline hash. In step 612, logic determines whether the baseline hash is the different from the snapshot hash. If the baseline hash is the same as the snapshot hash, the method 600 returns to step 604. On the other hand, if the baseline hash is different from the hash snapshot, in step 614, logic classifies the sample as malicious, and issues an appropriate bootkit alert. Where the computer may be running a virtual environment, the bootable disk may be a virtual disk, and the hash values are computed based on the boot content required to load an operating system to be run in the virtual environment.

One embodiment of the invention takes advantage of "software as a service" ("SaaS") principles of business, in which a bootkit detection system may be a cloud-based server providing services to one or more service subscribers. In this environment, the computers under test are located at one or more clients that avail themselves of the services of the bootkit detection system located, for example, within the Internet or within a proprietary network. In some embodiments, the services of the bootkit detection system may be provided by an IT service provider on behalf of a number of customers that subscribe to its services, each of which having at least one computer either located on the customer's premised or coupled to the customer's trusted network and which is to be tested for bootkits. The cloud-based bootkit detection system may use an agent installed on an endpoint, as shown and described in FIGS. 5 and 6, except portions of the method may be performed in the cloud, such as hash storage, hash comparison, and alert generation.

Controller Architecture

Figure 7:
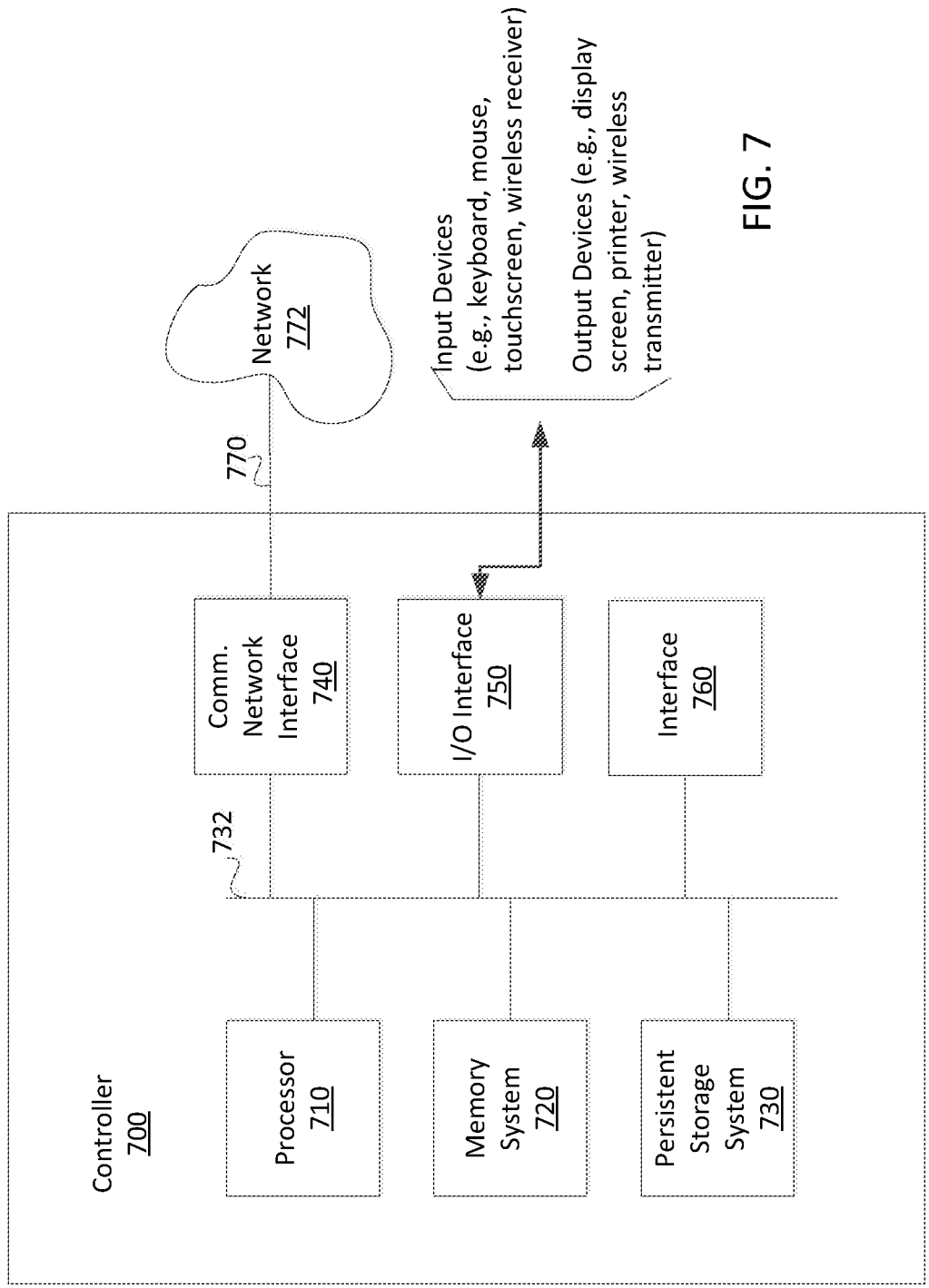
FIG. 7 is a block diagram of a controller for implementing a backdoor detection system in accordance with an illustrative embodiment of the invention.

FIG. 7 illustrates a controller 700 in accordance with an illustrative embodiment, which may implement a bootkit detection system as described elsewhere herein. The controller 700 may have at least a processor 710, a memory system 720, and a storage system 730, which are all coupled via an interconnect, such as bus 732. The processor 710 executes instructions. The terms, "execute" and "run", as used herein, are intended broadly to encompass the process of carrying out instructions, such as software instructions. The processor 710 may be implemented as one or more processor cores, and may be provided as a single device or as separate components. In some embodiments the processor may be implemented as a digital signal processor or application specific integrated circuits, and firmware may provide updatable logic. The memory system 720 permanently or temporarily stores data. The memory 720 may include, for example, RAM and/or ROM. The persistent storage system 730 also permanently or temporarily stores data. The storage system 730 may include, for example, one or more hard drives and/or flash drives, or other form of mass storage. The storage in memory 720 and storage 730 is not to be regarded as being transitory in nature.

Figure 8:
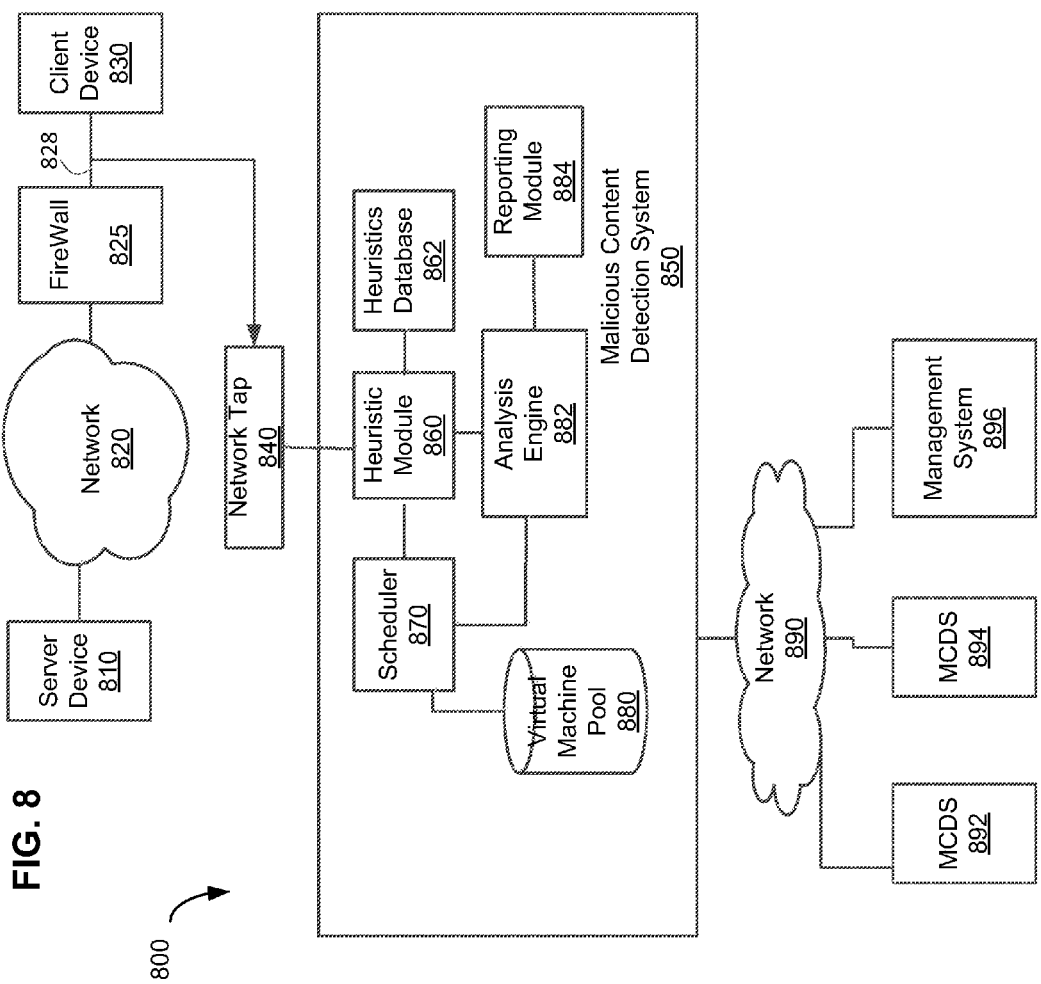
FIG. 8 is a block diagram of a computer network system deploying a malicious content detection system in accordance with an illustrative embodiment of the invention.

The controller 700 may also have a communication network interface 740, an input/output (I/O) interface 750, and a user interface 760. The communication network interface 740 may be coupled with a communication network 772 via a communication medium 770. The communications network interface 740 may communicate with other digital devices (not shown) via the communications medium 770. The communication interface 740 may include a network tap 840 (FIG. 8). The bus 720 may provide communications between the communications network interface 740, the processor 710, the memory system 720, the storage system 730, the I/O interface 750, and the user interface 760.

The I/O interface 750 may include any device that can receive input from or provide output to a user. The I/O interface 750 may include, but is not limited to, a flash drive, a compact disc (CD) drive, a digital versatile disc (DVD) drive, or other type of I/O peripheral (not separately shown). The user interface 760 may include, but is not limited to a keyboard, mouse, touch screen, keypad, biosensor, display monitor or other human-machine interface (not separately shown) to allow a user to control the controller 700. The display monitor may include a screen on which is provided a command line interface or graphical user interface.

In various embodiments of the invention, a number of different controllers (for example, each of a type as illustrated and described for controller 700 may be used to implement various components of embodiments of the invention.

Computer Network System with Malicious Content Detection System

FIG. 8 is a block diagram of an illustrative computer network system 800 having a malicious content detection system 850 in accordance with a further illustrative embodiment. The malicious content detection system 850 may implement, for example, the bootkit detection system 200 of FIG. 2 or the bootkit detection system 900 of FIG. 9. The malicious content detection system 850 is illustrated with a server device 810 and a client device 830, each coupled for communication via a communication network 820.

Network content is an example of content for malicious content detection purposes; however, other types of content can also be applied. Network content may include any data transmitted over a network (i.e., network data). Network data may include text, software, images, audio, or other digital data. An example of network content includes web content, or any network data that may be transmitted using a Hypertext Transfer Protocol (HTTP), HyperText Markup Language (HTML) protocol, or be transmitted in a manner suitable for display on a Web browser software application. Another example of network content includes email messages, which may be transmitted using an email protocol such as Simple Mail Transfer Protocol (SMTP), Post Office Protocol version 3 (POP3), or Internet Message Access Protocol (IMAP4). A further example of network content includes Instant Messages, which may be transmitted using an Instant Messaging protocol such as Session Initiation Protocol (SIP) or Extensible Messaging and Presence Protocol (XMPP). In addition, network content may include any network data that is transferred using other data transfer protocols, such as File Transfer Protocol (FTP).

The malicious network content detection system 850 may monitor exchanges of network content (e.g., Web content) in real-time rather than intercepting and holding the network content until such time as it can determine whether the network content includes malicious network content. The malicious network content detection system 850 may be configured to inspect exchanges of network content over the communication network 828, identify suspicious network content, and analyze the suspicious network content using a virtual machine to detect malicious network content. The communication network 820 may include a public computer network such as the Internet, in which case a firewall 825 may be interposed between the communication network 820 and the client device 830. Alternatively, the communication network may be a private computer network such as a wireless telecommunication network, wide area network, or local area network, or a combination of networks. Though the communication network 820 may include any type of network and be used to communicate different types of data, communications of Web data will be discussed below for purposes of example.

The malicious network content detection system 850 is shown as coupled with the network 820 by a network tap 840 (e.g., a data/packet capturing device). The network tap 840 may include a digital network tap configured to monitor network data and provide a copy of the network data to the malicious network content detection system 850. Network data may comprise signals and data that are transmitted over the communication network 820. The network tap 840 may copy any portion of the network data, for example, any number of data packets from the network data. In embodiments where the malicious content detection system 850 is implemented as an dedicated appliance or a dedicated computer system, the network tap 840 may include an assembly integrated into the appliance or computer system that includes network ports, network interface card and related logic (not shown) for connecting to the communication network 820 to non-disruptively "tap" traffic thereon and provide a copy of the traffic to the heuristic module 860. In other embodiments, the network tap 840 can be integrated into a firewall (e.g., using SCAN ports), router, switch or other network device (not shown) or can be a standalone component, such as an appropriate commercially available network tap. In virtual environments, a virtual tap (vTAP) can be used to copy traffic from virtual networks. The network tap 840 may also capture metadata from the network data. The metadata may be associated with the server device 810 and/or the client device 830. For example, the metadata may identify the server device 810 and/or the client device 830. In some embodiments, the server device 810 transmits metadata which is captured by the tap 815. In other embodiments, a heuristic module 860 (described herein) may analyze data packets within the network data in order to generate the metadata. The term, "content," as used herein may be construed to include the intercepted network data and/or the metadata unless the context requires otherwise.

The malicious network content detection system 825 may include a heuristic module 860, a heuristics database 862, a scheduler 870, a virtual machine pool 880, an analysis engine 882 and a reporting module 884. The heuristic module 860 receives the copy of the network data from the network tap 840 and applies heuristics to the data to determine if the network data might contain suspicious network content. The heuristics applied by the heuristic module 860 may be based on data and/or rules stored in the heuristics database 862. The heuristic module 860 may examine the image of the captured content without executing or opening the captured content. For example, the heuristic module 860 may examine the metadata or attributes of the captured content and/or the code image (e.g., a binary image of an executable) to determine whether a certain portion of the captured content matches a predetermined pattern or signature that is associated with a particular type of malicious content. In one example, the heuristic module 860 flags network data as suspicious after applying a heuristic analysis. When a characteristic of the packet, such as a sequence of characters or keyword, is identified that meets the conditions of a heuristic, a suspicious characteristic of the network content is identified. The identified characteristic may be stored for reference and analysis. In some embodiments, the entire packet may be inspected (e.g., using deep packet inspection techniques) and multiple characteristics may be identified before proceeding to the next step. In some embodiments, the characteristic may be determined as a result of an analysis across multiple packets comprising the network content. A score related to a probability that the suspicious characteristic identified indicates malicious network content is determined.

The heuristic module 860 may also provide a priority level for the packet and/or the features present in the packet. The scheduler 870 may then load and configure a virtual machine from the virtual machine pool 870 in an order related to the priority level, and dispatch the virtual machine to the analysis engine 882 to process the suspicious network content. The heuristic module 860 may provide the packet containing the suspicious network content to the scheduler 870, along with a list of the features present in the packet and the malicious probability scores associated with each of those features. Alternatively, the heuristic module 860 may provide a pointer to the packet containing the suspicious network content to the scheduler 870 such that the scheduler 870 may access the packet via a memory shared with the heuristic module 860.

The scheduler 870 may identify the client device 830 and retrieve a virtual machine from the virtual machine pool 880 corresponding to the client device 830. A virtual machine may itself be executable software that is configured to mimic the performance of a device (e.g., the client device 830). Furthermore, the scheduler 870 may identify, for example, a Web browser running on the client device 830, and retrieve a virtual machine associated with the web browser. In some embodiments, the heuristic module 860 transmits the metadata identifying the client device 830 to the scheduler 870. In other embodiments, the scheduler 870 receives one or more data packets of the network data from the heuristic module 860 and analyzes the one or more data packets to identify the client device 830. In yet other embodiments, the metadata may be received from the network tap 840.

The scheduler 870 may retrieve and configure the virtual machine to mimic the pertinent performance characteristics of the client device 830. In one example, the scheduler 870 configures the characteristics of the virtual machine to mimic only those features of the client device 830 that are affected by the network data copied by the network tap 840. The scheduler 870 may determine the features of the client device 830 that are affected by the network data by receiving and analyzing the network data from the network tap 840. Such features of the client device 830 may include ports that are to receive the network data, select device drivers that are to respond to the network data, and any other devices coupled to or contained within the client device 830 that can respond to the network data. In other embodiments, the heuristic module 860 may determine the features of the client device 830 that are affected by the network data by receiving and analyzing the network data from the network tap 840. The heuristic module 850 may then transmit the features of the client device to the scheduler 870.

The virtual machine pool 870 may be configured to store one or more virtual machines. The virtual machine pool 870 may include software and/or a storage medium capable of storing software. In one example, the virtual machine pool 870 stores a single virtual machine that can be configured by the scheduler 870 to mimic the performance of any client device 830 on the communication network 820. The virtual machine pool 870 may store any number of distinct virtual machines that can be configured to simulate the performance of a wide variety of client devices 830.

The scheduler 870 may operate to test the network content as to whether it may contain a bootkit as well as other malware. To detect a bootkit, the scheduler 870 may cause the analysis engine 882 to perform the steps of method 300 of FIG. 3. Accordingly, the analysis engine 882 generates the baseline hash, and awaits execution of the network content. The analysis engine 882 simulates the receipt and/or execution of the network content to analyze the effects of the network content upon the client device 830. The analysis engine 882 may identify the effects of malware or malicious network content within the virtual environment as provided by the virtual machine. The analysis engine 882 may be configured to monitor the virtual machine for indications that the suspicious network content is in fact malicious network content. In the case of a possible bootkit, such indications may include changes in the boot content (e.g., the MBR) as indicated by any differences between the baseline hash and hash snapshots. In the case of other kinds of malware, such indications may include unusual network transmissions, unusual changes in performance, and the like.

The analysis engine 882 may flag the suspicious network content as malicious network content according to the observed behavior of the virtual machine. The analysis engine 882 may also generate a signature based on the malicious network content, for example, applying a hashing algorithm to the content, or a portion thereof, or using another relevant identifier. Accordingly, the analysis engine may generate a signature based on the malicious network content containing a bootkit. The reporting module 884 may issue alerts indicating the presence of malware, and, using pointers and other reference information, identify the packets of the network content containing the malware, for example, using the signatures. Additionally, the server device 810 may be added to a list of malicious network content providers, and future network transmissions originating from the server device 810 may be blocked from reaching their intended destinations, e.g., by firewall 825.

A malware probability score may be generated for each sample of network content tested. The "static" detection or analysis performed by the heuristic module 860 may generate a first score (e.g., a static detection score) according to a first scoring scheme or algorithm. The "dynamic" detection or analysis performed by the analysis engine 882 may generate a second score (e.g., a dynamic detection score) according to a second scoring scheme or algorithm. The first and second scores may be combined, according to a predetermined algorithm, to derive a final score indicating the probability that a malicious content suspect is indeed malicious or should be declared or considered with high probability of malicious.

If a bootkit is discovered in the sample, the malware content detection system 850 may obtain additional information regarding the malware infestation by permitting the malware to execute within the virtual environment, monitoring its attributes and effects. For example, the malware content detection system 850 may gather threat intelligence such as malicious domains, for example, Top Level Domains, payloads, etc.

The computer network system 800 may also include a further communication network 890, which couples the malicious content detection system (MCDS) 850 with one or more other MCDS, of which MCDS 892 and MCDS 894 are shown, and a management system 896, which may be implemented as a Web server having a Web interface. The communication network 890 may, in some embodiments, be coupled for communication with or part of network 820. The management system 896 is responsible for managing the MCDS 850, 892, 894 and providing updates to their operation systems and software programs. Also, the management system 896 may cause malware signatures generated by any of the MCDS 850, 892, 894 to be shared with one or more of the other MCDS 850, 892, 894, for example, on a subscription basis. Moreover, the malicious content detection system as described in the foregoing embodiments may be incorporated into one or more of the MCDS 850, 892, 894, or into all of them, depending on the deployment. Also, the management system 896 itself or another dedicated computer station may incorporate the malicious content detection system in deployments where such detection is to be conducted at a centralized resource.

The management system 896 may manage the detection systems 850 and 892-894 in a variety of ways. For example, an administrator may activate or deactivate certain functionalities of malicious content detection systems 850 and 892-894 or alternatively, to distribute software updates such as malicious content definition files (e.g., malicious signatures or patterns) or rules, etc. Furthermore, a user may submit via a Web interface suspicious content to be analyzed, for example, by dedicated data analysis systems 892-894. Moreover, the detection systems 850 and 892-894 may share in carrying out operations with respect to an particular sample of network content. For example, static detection (using heuristics) may be performed by detection system 850 at a client site, while dynamic detection (using a virtual machine) of the same content can be offloaded to the cloud, for example, and performed by any of the other detection systems 892-894. Moreover, in the case of bootkit detection, baseline hash and hash snapshot generation may be performed by any of the detection systems 892-894, and hash comparison can be offloaded to the cloud, for example, and performed by any of the other detection systems 892-894.

Alternative Embodiment

Figure 9:
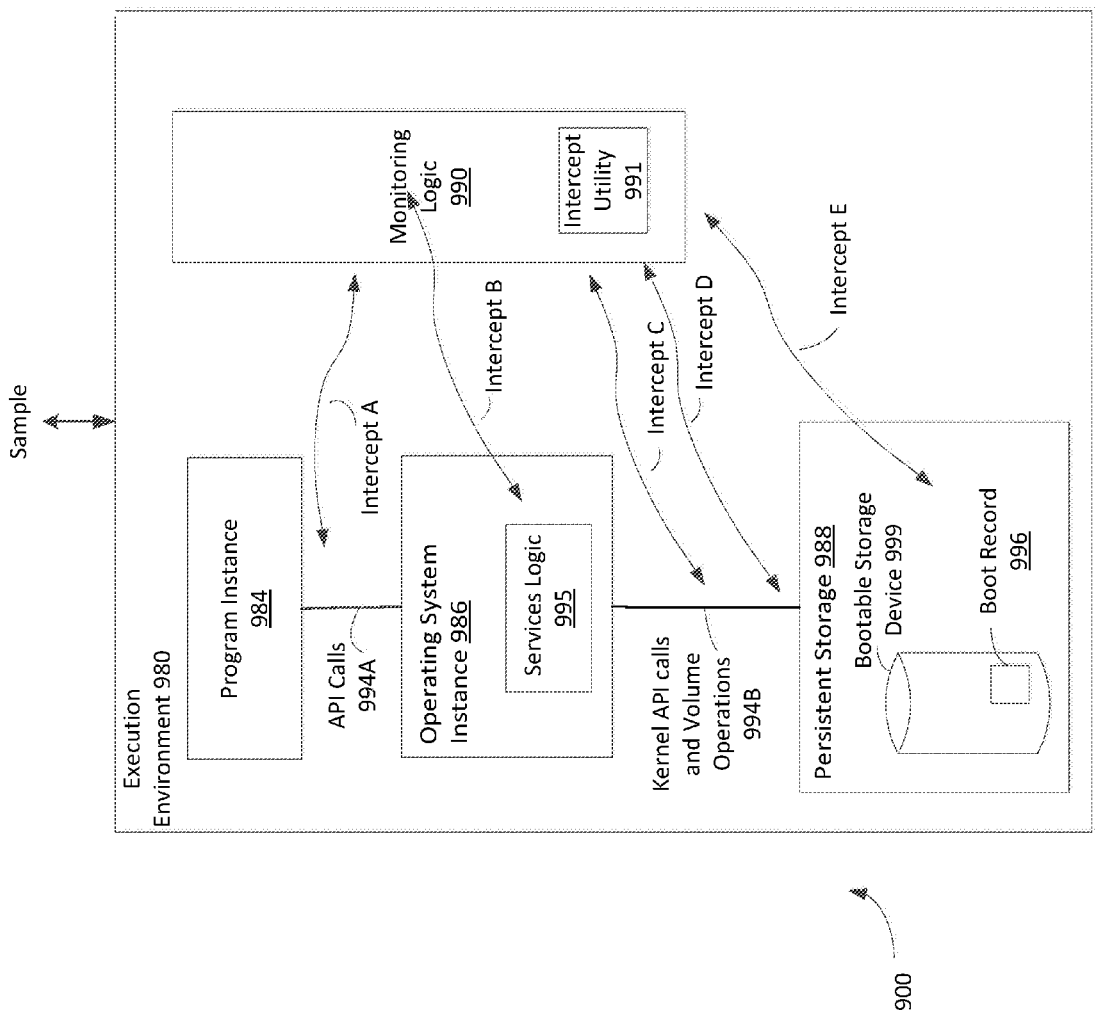
FIG. 9 is a block diagram of a bootkit detection system, configured for processing samples within a virtual environment, in accordance with an alternative, illustrative embodiment of the invention.

FIG. 9 depicts an alternative approach for detecting callbacks, which may be used instead of the previously-described signature-based approach, or, in some embodiments, in addition to that approach to increase the chances of detecting and defeating bootkits. This approach involves hooking or otherwise intercepting system calls and operations to persistent storage that seek to modify the boot content, and, in some embodiments, in particular, the MBR. This approach may use the same components described above with respect to FIG. 4, though, if a signature-based approach is not to be practiced, there would be no need for a hash generator 426. Instead, the monitoring module 416 (FIG. 4) may include an intercept utility, whose operation will be described in the following paragraphs.

Referring now to FIG. 9, the bootkit detection system 900 is configured for processing samples within an appropriate virtual environment. The bootkit detection system 900 may be implemented by controller, such as that shown in FIG. 7. The bootkit detection system 900 may include an execution environment 980 with at least one program instance (or process) 984 and an operating system instance 986; persistent storage 988; and a monitoring logic 990. The execution environment 980 may be real environment or a virtual environment. Where a virtual environment, the program instance 984 and operating system instance 986 may together constitute a guest image. The operating system 986 includes services logic 995 for performing services on behalf of programs, including program instance 984, such as network services, and initiating accesses to persistent storage 988. The persistent storage 988 includes a bootable storage device 999, such as, for example, a bootable disk. The bootable storage device 999 may contain a boot record 996, having boot content stored in boot locations. As mentioned above, the boot content includes executable code and data required to load an operating system, for example, in this case, operating system instance 986. Depending on the embodiment, the monitoring logic 990 may be internal to the execution environment 980, which may be preferred where the execution environment is a virtual environment, or external to the execution environment 980.

In operation, the monitoring logic 990 detects bootkit activity in various ways, depending on the embodiment. Where the samples are themselves executable programs, they may be run as program instance 984, for example, over the operating system instance 986. Where the samples are documents, such as PDF documents that may contain embedded executable objects that may, possibly contain bootkits, they may be loaded using an appropriate program, such as program instance 984. Where the samples require a particular computer application, such as a Web browser, the program instance 984 may be that browser.

During testing of the samples, the monitoring logic 990 may perform any and all of the following:

(a) Intercept, as diagrammatically illustrated by intercept "A", user-mode API calls (arrow 994A) passed by the program instance 984 to the operating system instance 986, which seek to execute WRITE, READ or APPEND operations, or otherwise change the content of the boot locations;

(b) Intercept, as diagrammatically illustrated by intercept "B", operations of a kernel-mode driver seeking to modify system services description table (SSDT) maintained by services logic 995 so as to change the content of the boot locations, which intercepting may be performed by an operating system, by logic external to the operating system, or by a virtual machine without involving the operating system in the intercepting;

(c) Intercept, as diagrammatically illustrated by arrow "C", either or both of kernel-mode API calls (arrow 994A) passed by the operating system instance 986 to persistent storage 988, which seek to execute WRITE, READ or APPEND operations, or otherwise change the content of the boot locations; and/or operations of a file-system level driver seeking to execute WRITE, READ or APPEND operations, or otherwise change the content of the boot locations;

(d) Intercept, as diagrammatically illustrated by arrow "D", operations of a volume-level driver seeking to execute WRITE, READ or APPEND operations, or otherwise change the content of the boot locations; and (e) Intercept, as diagrammatically illustrated by arrow "E", operations of a virtual machine introspection logic (not shown) seeking to change the content of the boot locations, which is applicable only in embodiments in which the execution environment 980 is a virtual environment.

As used herein, "API calls" is a general term intended to include system calls, RPC API calls, kernel-level API calls, and user-level API calls, and may be intercepted by any known hooking techniques. By hooking these API calls, and extracting the nature of the commands contained therein and their targeted addresses within persistent storage 988, the monitoring logic 990 may be directly viewing bootkit activity.

If the monitoring logic 900 intercepts API calls or other operations of a malicious nature, the sample may be classified as containing a bootkit. If no such malicious activity is observed, the sample may be classified as clean or requiring further analysis. In some embodiments, the analysis module 428 (FIG. 4) may perform the classification of the sample as clean or malicious. Thereafter, the classification may be recorded in the event log 432 (FIG. 4) and, if malicious, the alert generator 434 (FIG. 4) may issue an appropriate alert so that further action may be taken with respect to the bootkit.

CONCLUSION

It should be understood that the operations performed by the above-described illustrative embodiments are purely exemplary and imply no particular order unless explicitly required. Further, the operations may be used in any sequence when appropriate and may be partially used. Embodiments may employ various computer-implemented operations involving data stored in computer systems. These operations include physical manipulation of physical quantities. Usually, though not necessarily, these quantities take the form of electrical, magnetic, or optical signals capable of being stored, transferred, combined, compared, and otherwise manipulated.

Any of the operations described herein are useful machine operations. The present invention also relates to a device or an apparatus for performing these operations. The apparatus may be specially constructed for the required purpose, or the apparatus may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations, or multiple apparatus each performing a portion of the operations. Where apparatus or components of apparatus are described herein as being coupled or connected to other apparatus or other components, the connection may be direct or indirect, unless the context requires otherwise.

The present invention may be embodied as computer readable code on a computer readable medium. The computer readable medium is any data storage device that can store data, which can be thereafter read by a computer system. Examples of the computer readable medium include hard drives, flash drives, read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion. The computer readable medium can also be distributed using a switching fabric, such as used in compute farms.

The terms "logic", "module", "engine" and "unit" are representative of hardware, firmware or software that is configured to perform one or more functions. As hardware, these components may include circuitry such as processing circuitry (e.g., a microprocessor, one or more processor cores, a programmable gate array, a microcontroller, an application specific integrated circuit, etc.), receiver, transmitter and/or transceiver circuitry, semiconductor memory, combinatorial logic, or other types of electronic components. When implemented in software, the logic, modules, engines, and units may be in the form of one or more software modules, such as executable code in the form of an executable application, an operating system, an application programming interface (API), a subroutine, a function, a procedure, an applet, a servlet, a routine, source code, object code, a script, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage. Software is operational when executed by processing circuitry. Execution may be in the form of direct execution, emulation, or interpretation.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

It will be appreciated by those of ordinary skill in the art that modifications to and variations of the above-described embodiments of a system and method of detecting bootkits may be made without departing from the inventive concepts disclosed herein. Accordingly, the specification and drawings are to be regarded as illustrative rather than restrictive, and the invention should not be viewed as limited except as by the scope and spirit of the appended claims. It will be recognized that the terms "comprising," "including," and "having," as used herein, are specifically intended to be read as open-ended terms of art.

What is claimed is:

1. A computer-implemented method for detecting bootkit resident on a computer, comprising:
    performing an integrity check of a stored boot record comprising a master boot record, including:
        generating, at a first time, and storing a baseline hash of the master boot record, the baseline hash comprising a baseline signature;
        generating, at a second time, a first additional hash of the master boot record during processing of a content sample within a virtual machine, the second time being subsequent to the first time and the first additional hash comprising a first hash snapshot;
        comparing the baseline hash with the first hash snapshot and storing information indicating that the baseline hash and the first hash snapshot are not the same; and
    based on the stored information, issuing an alert of a resident bootkit.

2. The computer-implemented method of claim 1, wherein generating the first additional hash comprises generating a series of additional hashes while processing the content sample within the virtual machine, each hash included in the series of additional hashes comprising a corresponding hash snapshot, wherein a hash included in the series of additional hashes is generated periodically.

3. The computer-implemented method of claim 1, wherein generating the first additional hash comprises generating a series of additional hashes while processing the content sample within the virtual machine, each hash included in the series of additional hashes comprising a corresponding hash snapshot and generated at a separate time.

4. The computer-implemented method of claim 1, further comprising providing a virtual machine and a virtual disk storing the boot record and the master boot record, and processing a content sample in the virtual machine to determine whether the content sample comprises a bootkit.

5. The computer-implemented method of claim 4, further comprising processing the content sample to detect bootkit activity with respect to the boot record stored on a virtual disk located inside a guest image processing on the virtual machine.

6. The computer-implemented method of claim 4, further comprising processing the content sample to detect bootkit activity with respect to the boot record stored on a virtual disk located external to a guest image executing on the virtual machine.

7. The computer-implemented method of claim 1, wherein integrity checking comprises executing a bootkit detecting agent on an endpoint to access the boot record; and providing the master boot record for performing the integrity check, wherein the integrity check is performed to detect bootkits resident on the endpoint.

8. The computer-implemented method of claim 1, wherein a first computer generating the baseline hash and the first additional hash;
    and a second computer comparing the baseline hash and the first additional hash.

9. The computer-implemented method of claim 1, wherein the baseline hash and the first hash snapshot are generated from only the master boot record.

10. The computer-implemented method of claim 1, further comprising generating a new baseline hash after installing an operating system update.

11. The computer-implemented method of claim 1, further comprising storing the baseline hash as an obfuscated value.

12. The computer-implemented method of claim 1, wherein an operating system instance running on a virtual machine reports API calls seeking to change the contents of the master boot record.

13. The computer-implemented method of claim 1, further comprising:
    generating, at a third time, a second additional hash of the master boot record, the third time being subsequent to the second time and the second additional has comprising a second hash snapshot;
    comparing the baseline hash with the second hash snapshot and storing second information indicating that the baseline hash and the second hash snapshot are not the same; and
    based on the stored second information, issuing the alert of a resident bootkit.

14. The computer-implemented method of claim 13, wherein the third time is after the processing of the content sample has finished.

15. The computer-implemented method of claim 13, wherein the third time is during the processing of the content sample.

16. A system for detecting bootkit resident on a computer, comprising:
    an integrity checker operable in conjunction with a boot record stored in persistent storage comprising a master boot record, the integrity checker comprising:
    a hash generator configured to generate, at a first time, and store a baseline hash of the master boot record, the baseline hash comprising a baseline signature the hash generator being further configured to generate, at a second time, a first additional hash of the master boot record during processing of a content sample within a virtual machine, the second time being subsequent to the first time and the first additional hash comprising a first hash snapshot;
    a comparator configured to compare the baseline hash with the first hash snapshot and storing information indicating that the baseline hash and the first hash snapshot are not the same; and an alert generator configured to issue, based on the stored information, an alert of a resident bootkit.

17. The system of claim 16, wherein the hash generator hash snapshot is configured to generate a series of additional hashes while processing the content sample within the virtual machine, each hash included in the series of additional hashes comprising a corresponding hash snapshot and generated at a different point in time.

18. The system of claim 17, wherein the hash generator is configured to generate a series of additional hashes while processing the content sample within the virtual machine, each hash included in the series of additional hashes comprising a corresponding hash snapshot, wherein a hash included the series of additional hashes is generated periodically.

19. The system of claim 16, further comprising a virtual machine including a virtual disk having the boot record and the master boot record, and configured to process a content sample therein to determine whether the content sample comprises a bootkit.

20. The system of claim 16, further comprising a bootkit detecting agent configured to execute within an endpoint to access the boot record; and providing the master boot record to the integrity checker, wherein the integrity checker is configured to detect bootkits resident on the endpoint.

21. The computer-implemented method of claim 16, wherein the hash generator is configured to generate the baseline hash and the first hash snapshot from only the master boot record.

22. A non-transitory machine-readable medium storing instructions,
    which when executed by a processor, cause the processor to perform a method of bootkit detection, the instructions including:
    instructions for generating, at a first time, and storing a baseline hash of a master boot record, the baseline hash comprising a baseline signature;
    instructions for generating, at a second time, a first additional hash of a master boot record during processing of a content sample within a virtual machine, the second time being subsequent to the first time, the first additional hash comprising a first hash snapshot;
    instructions for comparing the baseline hash with the first hash snapshot and storing information indicating that the baseline hash and the hash snapshot are not the same; and
    instructions for issuing, based on the stored information, an alert of a resident bootkit.

23. The non-transitory machine-readable medium storing instructions of claim 22, wherein the instructions further comprise: instructions for executing a virtual machine including a virtual disk having the boot record and the master boot record, and processing a content sample therein to determine whether the content sample comprises a bootkit.

24. The non-transitory machine-readable medium storing instructions of claim 22, wherein the instructions further comprise:
    instructions for executing a bootkit detecting agent on an endpoint to access the boot record;
    instructions for providing at least one sector generating the baseline hash and at least one hash snapshot; and
    instructions to detect bootkits resident on the endpoint based on comparing the baseline hash with at least one hash snapshot.

25. A system for detecting a bootkit resident on a computer, comprising:
    a monitoring logic configured to detect a change or attempted change to contents of the Moot locations of persistent storage while a content sample is processed in a virtual machine, wherein the detected change or attempted change comprises evidence of a resident bootkit based on a comparison of (i) a baseline hash of the contents of the boot locations generated prior to processing the content sample in the virtual machine and (ii) a hash of the contents of the boot locations generated during processing of the content sample in the virtual machine; and
    an alert generator configured to issue, responsive to and in communication with the monitoring logic, an alert regarding the evidence of a resident bootkit.

26. The system of claim 25, wherein the monitoring logic is configured to monitor computer operations seeking to change the content of boot locations of persistent storage.

27. The system of claim 25, wherein the monitoring logic comprising an intercept utility configured to intercept API calls seeking to change the content of boot locations of persistent storage.

28. The system of claim 25, further comprising a virtual execution environment, and wherein the persistent storage comprises virtual persistent storage.

* * * * *